(12) United States Patent
Ihara et al.

(10) Patent No.: US 9,012,095 B2
(45) Date of Patent: Apr. 21, 2015

(54) ELECTROLYTE AND SECONDARY BATTERY

(75) Inventors: Masayuki Ihara, Fukushima (JP);
Shinya Wakita, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1152 days.

(21) Appl. No.: 12/684,182

(22) Filed: Jan. 8, 2010

(65) Prior Publication Data
US 2010/0178569 A1    Jul. 15, 2010

(30) Foreign Application Priority Data
Jan. 15, 2009    (JP) ............................ P2009-006441

(51) Int. Cl.
| H01M 6/16 | (2006.01) |
| H01M 10/0567 | (2010.01) |
| H01M 4/133 | (2010.01) |
| H01M 4/134 | (2010.01) |
| H01M 4/38 | (2006.01) |
| H01M 4/525 | (2010.01) |
| H01M 4/587 | (2010.01) |
| H01M 10/052 | (2010.01) |
| H01M 10/0525 | (2010.01) |
| H01M 10/0568 | (2010.01) |
| H01M 10/0569 | (2010.01) |

(52) U.S. Cl.
CPC .......... *H01M 10/0567* (2013.01); *H01M 4/133* (2013.01); *H01M 4/134* (2013.01); *H01M 4/38* (2013.01); *H01M 4/525* (2013.01); *H01M 4/587* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0091* (2013.01); *Y02E 60/122* (2013.01)

(58) Field of Classification Search
USPC ......... 429/340, 334, 335, 341, 342, 343, 199, 429/200; 252/62.2
See application file for complete search history.

(56) References Cited

U.S. PATENT DOCUMENTS

| 6,436,582 B1 * | 8/2002 | Hamamoto et al. .......... 429/340 |
| 2007/0154815 A1 * | 7/2007 | Kawasaki et al. ............. 429/340 |
| 2008/0096112 A1 | 4/2008 | Ihara et al. |
| 2008/0286648 A1 | 11/2008 | Ihara et al. |
| 2008/0292971 A1 * | 11/2008 | Ihara et al. .................... 429/333 |
| 2008/0305391 A1 | 12/2008 | Hirose et al. |
| 2010/0119956 A1 | 5/2010 | Tokuda et al. |

FOREIGN PATENT DOCUMENTS

| JP | 1997-190819 | 7/1997 |
| JP | 1997-190820 | 7/1997 |
| JP | 11067270 | 9/1999 |
| JP | 2000-012079 | 1/2000 |
| JP | 2001-057235 | 2/2001 |
| JP | 2002-008718 | 1/2002 |
| JP | 2003-151623 | 5/2003 |
| JP | 2004-022336 | 1/2004 |
| JP | 2004-335379 | 11/2004 |
| JP | 2005-011594 | 1/2005 |
| JP | 2006-134684 | 5/2006 |
| JP | 2006-351242 | 12/2006 |
| JP | 2008-053212 | 3/2008 |
| JP | 2008-135382 | 6/2008 |
| JP | 2008-147117 | 6/2008 |
| JP | 2008-288144 | 11/2008 |
| WO | 2008/126800 | 10/2008 |

OTHER PUBLICATIONS

Partial European Search Report dated Sep. 14, 2010 corresponding to European Patent Appln. No. 10000266.
Japanese Office Action issued Jul. 23, 2013 in corresponding Japanese Patent Application No. 2009-006441.
Japanese Office Action issued Apr. 2, 2013 in corresponding Japanese Patent Application No. 2009-006441.

* cited by examiner

*Primary Examiner* — Laura Weiner
(74) *Attorney, Agent, or Firm* — K&L Gates LLP

(57) ABSTRACT

An electrolyte includes a solvent and an electrolyte salt. The solvent contains at least one selected from ester compounds, lithium monofluorophosphate, and lithium difluorophosphate, and at least one selected from anhydrous compounds. The ester compounds are chain compounds having ester moieties, such as (—O—C(=O)—O—R), at both ends. The anhydrous compounds are cyclic compounds having, for example, a disulfonic anhydride group, (—S(O=)$_2$—O—S(O=)$_2$—).

20 Claims, 7 Drawing Sheets

ELECTROLYTE AND SECONDARY BATTERY

CROSS REFERENCES TO RELATED APPLICATIONS

The present application contains subject matter related to that disclosed in Japanese Priority Patent Application JP 2009-006441 filed in the Japan Patent Office on Jan. 15, 2009, the entire content of which is hereby incorporated by reference.

BACKGROUND

The present application relates to an electrolyte containing a solvent and an electrolyte salt and a secondary battery using the electrolyte.

In recent years, portable electronic devices such as video cameras, digital still cameras, cellular phones, and notebook computers have become increasingly popular. There is strong need for reducing their size and weight and extending their lifetime. Under such trends, development of batteries, in particular, secondary batteries, that can be used as power sources, are small and light-weight, and achieve high energy densities is proceeding.

In particular, lithium-ion secondary batteries that utilize occlusion and release of lithium ions and lithium metal secondary batteries that utilize precipitation and dissolution of lithium metal for charge/discharge reactions are considered to have great potentials. This is because they achieve energy densities higher than that achieved by lead batteries or nickel-cadmium batteries.

A secondary battery includes a positive electrode, a negative electrode, and an electrolyte. The positive electrode includes a positive electrode collector and a positive electrode active material layer on the positive electrode collector. The negative electrode includes a negative electrode collector and a negative electrode active material layer on the negative electrode collector. The electrolyte contains a solvent and an electrolyte salt.

The electrolyte functions as a medium for charge/discharge reactions and greatly affects the performance of secondary batteries. Thus, various investigations have been conducted on the composition of the electrolyte.

In particular, in order to improve cycle characteristics and the like, formic acid, acetic acid, oxalic acid, malonic acid, maleic acid, fumaric acid, benzoic acid, and the like are used (e.g., refer to Japanese Unexamined Patent Application Publication Nos. 2000-012079 and 2006-351242). Note that oxalic acid, succinic acid, malonic acid, adipic acid, sebacic acid, and phosphoric acid and their metal salts are also used in positive and negative electrodes as well as the electrolyte (e.g., refer to Japanese Unexamined Patent Application Publication Nos. 09-190819, 09-190820, 2004-335379, 2005-011594, and 2006-134684). In order to improve cycle characteristics, storage characteristics, and the like, disulfonic anhydrides, sulfonic-carboxylic anhydrides, etc., are used (e.g., refer to Japanese Unexamined Patent Application Publication Nos. 2004-022336 and 2002-008718)

SUMMARY

In recent years, portable electronic devices have shown increasingly higher performance and versatility and the power consumption of these devices tends to rise. Since charge/discharge operation of secondary batteries is frequently repeated, cycle characteristics of the secondary batteries tend to degrade easily. While portable electronic devices are compact in size and can be carried along, they may be exposed to a high-temperature environment during transportation, storage, or the like. Thus, storage characteristics of the secondary batteries also tend to degrade easily. In view of the above, further improvements in cycle characteristics and storage characteristics of the secondary batteries are desired.

Thus, it is desirable to provide an electrolyte that can improve cycle characteristics and storage characteristics and a secondary battery that uses such an electrolyte.

An electrolyte according to an embodiment of the present application includes a solvent and an electrolyte salt. The solvent contains at least one selected from ester compounds represented by formulae (1) to (3), lithium monofluorophosphate, and lithium difluorophosphate, and at least one selected from anhydrous compounds represented by formulae (4) and (5) below. A secondary battery according to an embodiment of the present invention includes a positive electrode, a negative electrode, and an electrolyte that contains a solvent and an electrolyte salt, the electrolyte having the above-described composition.

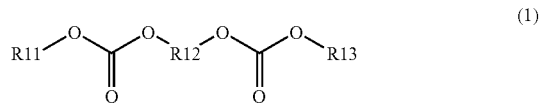

(R11 and R13 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R12 represents a linear or branched alkylene group, an arylene group, a divalent group containing an arylene group and an alkylene group, a C2-C12 divalent group containing an ether bond and an alkylene group, or a halogenated group thereof.)

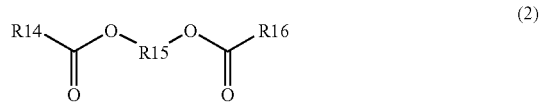

(R14 and R16 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R15 represents a linear or branched alkylene group, an arylene group, a divalent group containing an arylene group and an alkylene group, a C2-C12 divalent group containing an ether bond and an alkylene group, or a halogenated group thereof.)

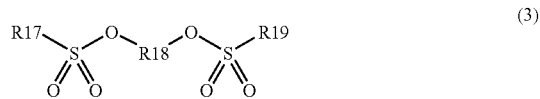

(R17 and R19 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R18 represents a linear or branched alkylene group, an arylene group, a divalent group containing an arylene group and an alkylene group, a C2-C12 divalent group containing an ether bond and an alkylene group, or a halogenated group thereof.)

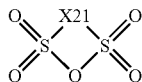

(4)

(X21 represents a C2-C4 alkylene group that may be halogenated, a C2-C4 alkenylene group that may be halogenated, an arylene group that may be halogenated, or a derivative thereof.)

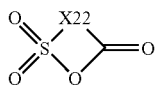

(5)

(X22 represents a C2-C4 alkylene group that may be halogenated, a C2-C4 alkenylene group that may be halogenated, an arylene group that may be halogenated, or a derivative thereof.).

Since the solvent in the electrolyte contains at least one selected from ester compounds represented by formulae (1) to (3), lithium monofluorophosphate, and lithium difluorophosphate, and at least one selected from anhydrous compounds represented by formulae (4) and (5), chemical stability of the electrolyte improves compared to when only one or none of ester compound or the like and the anhydrous compound is contained. Thus, when the electrolyte is used in a secondary battery, the cycle characteristics and the storage characteristics can be improved Additional features and advantages are described herein, and will be apparent from the following Detailed Description and the figures.

DETAILED DESCRIPTION

Figure 1:
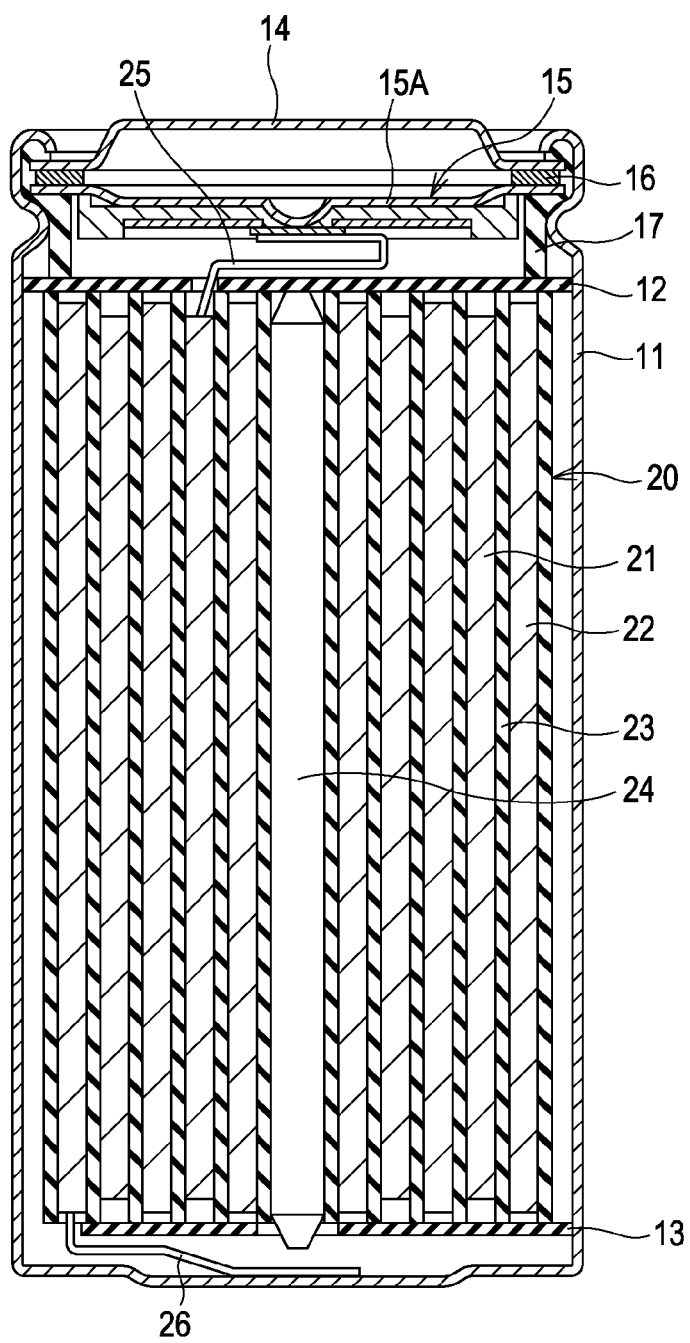
FIG. 1 is a cross-sectional view showing the structure of a first secondary battery including an electrolyte according to one embodiment.

The present application will be described in detail below with reference to the drawings according to an embodiment. The description is provided in the following order:
1. Electrolyte
2. Electrochemical devices (secondary batteries) using the electrolyte
2-1. First secondary battery (lithium ion secondary battery: cylindrical)
2-2. Second secondary battery (lithium metal secondary battery: cylindrical)
2-3. Third secondary battery (lithium ion secondary battery: laminate film)

1. Electrolyte

An electrolyte according to an embodiment is used in, for example, electrochemical devices such as secondary batteries and prepared by dissolving an electrolyte salt in a solvent. The electrolyte may contain other materials such as various additives in addition to the solvent and the electrolyte salt.

Solvent

The solvent contains at least one selected from ester compounds represented by formulae (1) to (3) below, lithium monofluorophosphate, and lithium difluorophosphate, and at least one selected from anhydrous compounds represented by formulae (4) and (5). This is because the chemical stability of the electrolyte is higher than when the solvent contains neither the ester compound or the like nor the anhydrous compound or when the solvent contains only one of the ester compound or the like and the anhydrous compound. In the description below, the ester compounds represented by formulae (1) to (3) are collectively referred to as "ester compound(s)" if desired and the anhydrous compounds represented by formulae (4) and (5) are collectively referred to as "anhydrous compound(s)" if desired.

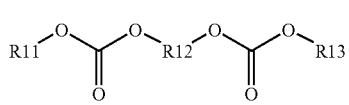

(1)

(R11 and R13 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R12 represents a linear or branched alkylene group, an arylene group, a divalent group containing an arylene group and an alkylene group, a C2-C12 divalent group containing an ether bond and an alkylene group, or a halogenated group thereof.)

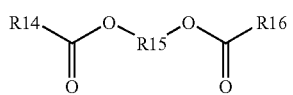

(2)

(R14 and R16 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R15 represents a linear or branched alkylene group, an arylene group, a divalent group containing an arylene group and an alkylene group, a C2-C12 divalent group containing an ether bond and an alkylene group, or a halogenated group thereof.)

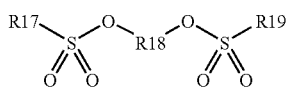 (3)

(R17 and R19 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof. R18 represents a linear or branched alkylene group, an arylene group, a divalent group containing an arylene group and an alkylene group, a C2-C12 divalent group containing an ether bond and an alkylene group, or a halogenated group thereof.)

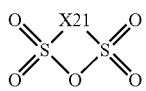 (4)

(X21 represents a C2-C4 alkylene group that may be halogenated, a C2-C4 alkenylene group that may be halogenated, an arylene group that may be halogenated, or a derivative thereof.)

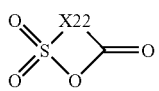 (5)

(X22 represents a C2-C4 alkylene group that may be halogenated, a C2-C4 alkenylene group that may be halogenated, an arylene group that may be halogenated, or a derivative thereof.)

The ester compound represented by formula (1) is a compound having ester moieties (—O—C(=O)—O—R) at both ends. R11 and R13 may be the same as or different from each other.

For R11 and R13, examples of the alkyl group include the following groups: a methyl group, an ethyl group, a n (normal)-propyl group, an isopropyl group, a n-butyl group, an isobutyl group, a secondary (sec-) butyl group, a tertiary (tert-) butyl group, a n-pentyl group, a 2-methylbutyl group, a 3-methylbutyl group, a 2,2-dimethylpropyl group, and a n-hexyl group. Examples of the alkenyl group include a n-heptyl group, a vinyl group, a 2-methylvinyl group, a 2,2-dimethylvinyl group, a butene-2,4-diyl group, and an allyl group. An example of the alkynyl group is an ethynyl group. The number of carbon atoms in the alkyl group etc., described above is not particularly limited but is preferably 1 to 20, more preferably 1 to 7, and most preferably 1 to 4. This is because good solubility and compatibility can be achieved.

When R11 and R13 are each an alkyl group or the like substituted with an aromatic hydrocarbon group or an alicyclic hydrocarbon group, the aromatic hydrocarbon group may be, for example, a phenyl group and the alicyclic hydrocarbon group may be, for example, a cyclohexyl group. A phenyl-substituted alkyl group (aralkyl group) is, for example, a benzyl group or a 2-phenylethyl group (phenetyl group).

When R11 and R13 are each a halogenated alkyl group or the like, for example, the halogenated alkyl group may be a fluorinated alkyl group. Examples of the fluorinated alkyl group include a fluoromethyl group, a difluoromethyl group, a trifluoromethyl group, a 2,2,2-trifluoroethyl group, and a pentafluoroethyl group. Note that a "halogenated group" is a group such as an alkyl group having at least part of hydrogen atoms substituted with halogen.

In particular, R11 and R13 are each preferably a group substituted with an aromatic hydrocarbon group or an alicyclic hydrocarbon group rather than a halogenated group, and are each more preferably a group that is not substituted with an aromatic hydrocarbon group or an alicyclic hydrocarbon group. The number of carbon atoms in the group substituted with the aromatic hydrocarbon group or the alicyclic hydrocarbon group is not particularly limited. The total number of carbon atoms in the aromatic or alicyclic hydrocarbon group and the alkyl group or the like is preferably 20 or less and more preferably 7 or less. Note that R11 and R13 may each be a derivative of an alkyl group or the like. Here, a "derivative" refers to a group, such as an alkyl group, into which one or more substituents are introduced. The substituent may be a hydrocarbon group or any other group.

When R12 is a linear or branched alkylene group or the like, the number of carbon atoms is not particularly limited but is preferably 2 to 10, more preferably 2 to 6, and most preferably 2 to 4. This is because good solubility and compatibility can be achieved. The divalent group containing an arylene group and an alkylene group may be a group in which one arylene group is bonded to one alkylene group or a group (aralkylene) in which two alkylene groups are bonded through an arylene group.

In such a case, examples of R12 include following groups: linear alkylene groups represented by formulae (1-11) to (1-17), branched alkylene groups represented by formulae (1-18) to (1-26), arylene groups represented by formulae (1-27) to (1-29) and divalent groups represented by formulae (1-30) to (1-32) containing an arylene group and alkylene groups. The divalent groups represented by formulae (1-30) to (1-32) are so-called benzylidene groups.

 (1-11)

 (1-12)

 (1-13)

 (1-14)

 (1-15)

 (1-16)

 (1-17)

 (1-18)

 (1-19)

(1-20) 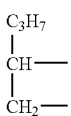

(1-21) 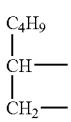

(1-22) 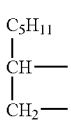

(1-23) 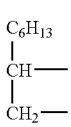

(1-24) 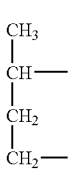

(1-25) 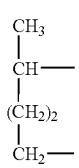

(1-26) 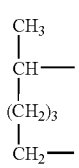

(1-27) 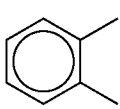

(1-28) 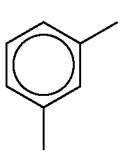

(1-29) 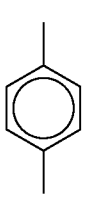

(1-30) 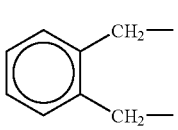

(1-31) 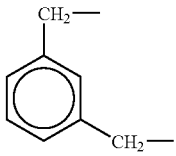

(1-32) 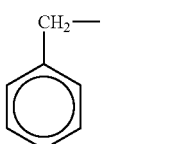

When R12 is a C2-C12 divalent group having an ether bond and an alkylene group, the divalent group is preferably a group having at least two alkylene groups linked through an ether bond and carbon atoms at both ends. The number of carbon atoms of such a group is preferably 4 to 12. This is because good solubility and compatibility can be achieved. It should be noted that in the C2-C12 divalent group containing an ether bond and alkylene groups, the number of ether bonds and the order in which the ether bonds and the alkylene groups are linked can be freely set.

Examples of R12 in such a case include groups represented by formulae (1-33) to (1-45). When the divalent groups represented by formulae (1-33) to (1-45) are fluorinated, examples of R12 include groups represented by formulae (1-46) to (1-54). Among these, groups represented by (1-38) to (1-40) are preferable. Note that R12 may be a derivative of the alkylene group or the like.

$$-CH_2-O-CH_2- \quad (1\text{-}33)$$

$$-CH_2-(O-CH_2)_2- \quad (1\text{-}34)$$

$$-CH_2-(O-CH_2)_3- \quad (1\text{-}35)$$

$$-CH_2-(O-CH_2)_4- \quad (1\text{-}36)$$

$$-CH_2-(O-CH_2)_5- \quad (1\text{-}37)$$

$$-CH_2-CH_2-O-CH_2-CH_2- \quad (1\text{-}38)$$

$$-CH_2-CH_2-(O-CH_2-CH_2)_2- \quad (1\text{-}39)$$

$$-CH_2-CH_2-(O-CH_2-CH_2)_3- \quad (1\text{-}40)$$

$$-CH_2-CH_2-(O-CH_2-CH_2)_4- \quad (1\text{-}41)$$

$$-CH_2-CH_2-(O-CH_2-CH_2)_5- \quad (1\text{-}42)$$

$$-CH_2-CH_2-CH_2-O-CH_2-CH_2-CH_2- \quad (1\text{-}43)$$

$$-CH_2-CH_2-CH_2-(O-CH_2-CH_2-CH_2)_2- \quad (1\text{-}44)$$

$$-CH_2-CH_2-CH_2-(O-CH_2-CH_2-CH_2)_3- \quad (1\text{-}45)$$

$$-CF_2-O-CF_2- \quad (1\text{-}46)$$

$$-CF_2-(O-CF_2)_2- \quad (1\text{-}47)$$

—CF₂—(O—CF₂)₃— (1-48)

—CF₂—CF₂—O—CF₂—CF₂— (1-49)

—CF₂—CF₂—(O—CF₂—CF₂)₂— (1-50)

—CF₂—CF₂—(O—CF₂—CF₂)₃— (1-51)

—CH₂—CF₂—O—CF₂—CH₂— (1-52)

—CH₂—CF₂—O—CF₂—CF₂—O—CF₂—CH₂— (1-53)

—CH₂—CF₂—(O—CF₂—CF₂)₂O—CF₂—CH₂— (1-54)

The molecular weight of the ester compound represented by formula (1) is not particularly limited but is preferably 200 to 800, more preferably 200 to 600, and most preferably 200 to 450. This is because good solubility and compatibility can be achieved.

Specific examples of the ester compound represented by formula (1) include a compound represented by formula (1-1). This is because high effects can be achieved. The ester compound represented by formula (1) is not limited to one represented by formula (1-1) and may be any other compound.

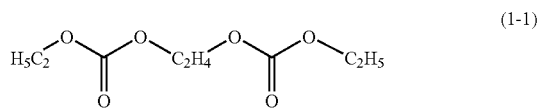
(1-1)

The ester compound represented by formula (2) is a compound having ester moieties (—O—C(=O)—R) at both ends. R14 and R16 may be the same as or different from each other. The details for R14 and R16 are the same as those for R11 and R13 described above. The details for R15 are the same as those for R12 described above.

The molecular weight of the ester compound represented by formula (2) is not particularly limited but is preferably 162 to 1000, more preferably 162 to 500, and most preferably 162 to 300. This is because good solubility and compatibility can be achieved.

Specific examples of the ester compound represented by formula (2) include a compound represented by formula (2-1). This is because high effects can be achieved.

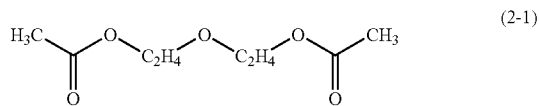
(2-1)

Other examples of the ester compound represented by formula (2) include diethylene glycol dipropionate, diethylene glycol dibutyrate, triethylene glycol diacetate, triethylene glycol dipropionate, triethylene glycol dibutyrate, tetraethylene glycol diacetate, tetraethylene glycol dipropionate, and tetraethylene glycol dibutyrate. The ester compound represented by formula (2) is not limited to one represented by formula (2-1) and may be any other compound.

The ester compound represented by formula (3) is a compound having ester moieties (—O—S(=O)₂—R) at both ends. R17 and R19 may be the same as or different from each other. The details for R17 and R19 are the same as those for R11 and R13 described above. The details for R18 are the same as those for R12 described above.

The molecular weight of the ester compound represented by formula (3) is not particularly limited but is preferably 200 to 800, more preferably 200 to 600, and most preferably 200 to 450. This is because good solubility and compatibility can be achieved.

Specific examples of the ester compound represented by formula (3) include a compound represented by formula (3-1). This is because high effects can be achieved. The ester compound represented by formula (3) is not limited to one represented by formula (3-1) and may be any other compound.

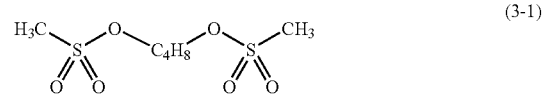
(3-1)

The anhydrous compound represented by formula (4) is a cyclic compound having a disulfonic anhydride group (—S(O=)₂—O—S(O=)₂—). X21 may be linear or branched. A perfluoro group is particularly preferred as the "halogenated group". The type of halogen is not particularly limited but fluorine is preferred. This is because chemical stability of the anhydrous compound can be improved. Here, a "derivative" refers to a group, such as an alkyl group, into which one or more substituents are introduced. The substituent may be a hydrocarbon group or any other group.

The number of carbon atoms in X21 is 2 to 4 since good solubility and compatibility can be obtained and the chemical stability of the anhydrous compound can be improved. To be more specific, if the number of carbon atoms is 1, sufficient chemical stability may not be obtained and if the number is 5 or more, sufficient solubility and compatibility may not be obtained.

Specific examples of the anhydrous compound represented by formula (4) include compounds represented by formulae (4-1) to (4-22). The anhydrous compound include geometric isomers. Among these, groups represented by (4-1) and (4-2) are preferable. This is because they can achieve high effects and are highly available. The anhydrous compound represented by formula (4) is not limited to those represented by formulae (4-1) to (4-22) and may be any other compound.

(4-1)

(4-2)

(4-3)

(4-4) 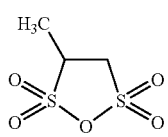

(4-5) 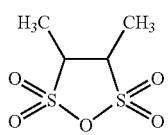

(4-6) 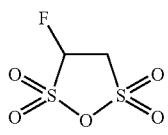

(4-7) 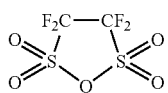

(4-8) 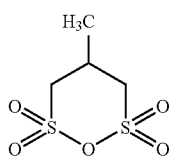

(4-9) 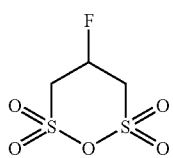

(4-10) 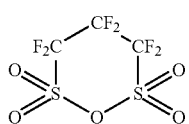

(4-11) 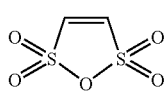

(4-12) 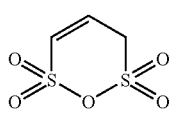

(4-13) 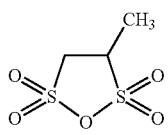

(4-14) 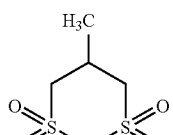

(4-15) 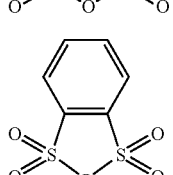

(4-16) 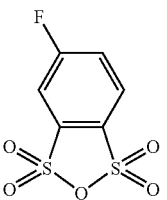

(4-17) 

(4-18) 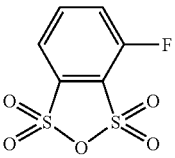

(4-19) 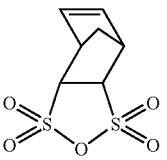

(4-20) 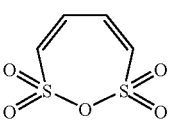

(4-21) 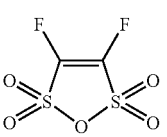

(4-22) 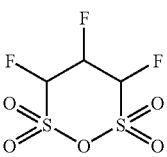

The anhydrous compound represented by formula (5) is a cyclic compound having a sulfonic-carboxylic anhydride group (—S(O=)$_2$—O—C(=O)—). The details of the structure of and the number of carbon atoms in X22 are the same as those of X21 described above.

Specific examples of the anhydrous compound represented by formula (5) include compounds represented by formulae (5-1) to (5-20). The anhydrous compound include geometric isomers. Among these, the compound represented by formula (5-1) is preferred. This is because it can achieve high effects and is highly available. The anhydrous compound represented by formula (5) is not limited to those represented by formulae (5-1) to (5-20) and may be any other compound.

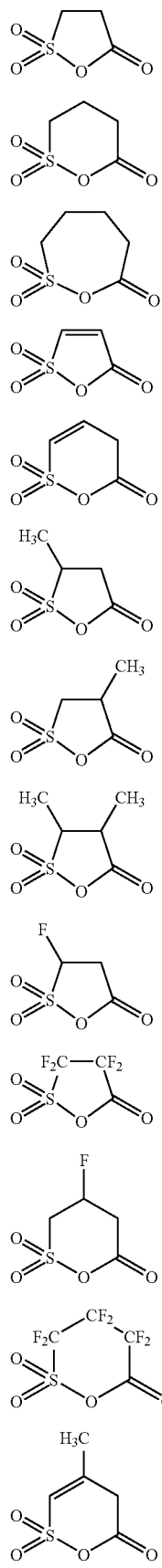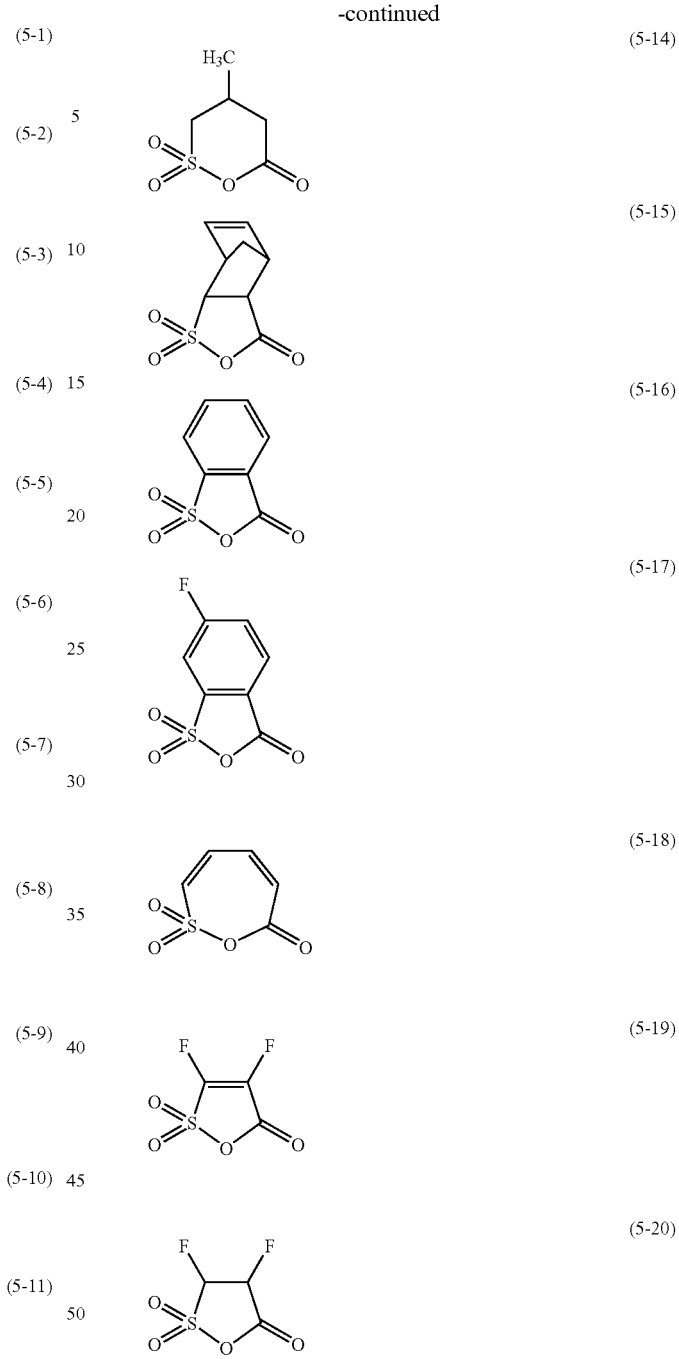

The content of at least one of the ester compounds, lithium monofluorophosphate, and lithium difluorophosphate in the solvent is not particularly limited. In particular, the content is preferably 0.001 wt % to 10 wt % and more preferably 0.001 wt % to 1 wt %. The anhydrous compound content in the solvent is not particularly limited but is preferably 0.01 wt % to 1 wt %. This is because chemical stability of the electrolyte can be improved further.

The solvent preferably contains a phosphoric acid compound represented by formula (6) in addition to the ester compound or the like and the anhydrous compound described above. This is because chemical stability of the electrolyte can be improved further.

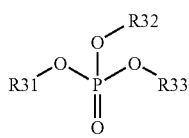

(6)

(R31 to R33 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof.)

The details of R31 to R33 are the same as those of R11 and R13 described above. The molecular weight of the phosphoric acid compound is not particularly limited but is preferably 200 to 800, more preferably 200 to 600, and most preferably 200 to 450. This is because good solubility and compatibility can be achieved.

Examples of the phosphoric acid compound include one represented by formula (6-1). This is because it can achieve high effects and is highly available. The phosphoric acid compound is not limited to one represented by formula (6-1) and may be any other compound.

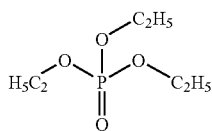

(6-1)

The phosphoric acid compound content in the solvent is not particularly limited but is preferably 0.001 wt % to 1 wt %. This is because higher effects can be obtained.

The solvent may contain other materials as long as it contains the ester compound or the like and the anhydrous compound described above and, if occasion demands, the phosphoric acid compound. Examples of other materials include one or more nonaqueous solvents such as organic solvents described below. Note that nonaqueous solvents that correspond to the ester compound or the like, the anhydrous compound, and the phosphoric acid compound are excluded from the nonaqueous solvents described below.

Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trim ethyl acetate, ethyl trimethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because electrochemical devices that use such electrolytes exhibit good characteristics. Examples of the characteristics include battery capacities, cycle characteristics, and storage characteristics when electrolytes are used in secondary batteries.

Of these, at least one selected from ethylene carbonate, propylene carbonate, dimethyl carbonate, diethyl carbonate, and ethyl methyl carbonate is preferred. This is because good battery capacities, cycle characteristics, storage characteristics, etc., can be obtained. In such a case, a combination of a high-viscosity (high-dielectric-constant) solvent (e.g., relative dielectric constant ∈≥30) such as ethylene carbonate or propylene carbonate and a low-viscosity solvent (e.g., viscosity ≤1 mPa·s) such as dimethyl carbonate, ethyl methyl carbonate, or diethyl carbonate is more preferred. This is because the dissociability of the electrolyte salt and the mobility of ions improve.

In particular, the solvent preferably contains at least one selected from unsaturated carbon bond-containing cyclic carbonic acid esters represented by formulae (7) to (9). This is because decomposition reaction of the electrolyte is suppressed by the formation of a stable protective film on the electrode surface at the time of electrode reaction. The "unsaturated carbon bond-containing cyclic carbonic acid ester" is a cyclic carbonic acid ester having an unsaturated carbon bond. The unsaturated carbon bond-containing cyclic carbonic acid ester content in the solvent is, for example, 0.01 wt % to 10 wt %. The type of the unsaturated carbon bond-containing carbonic acid ester is not limited to those described below and may be any other type.

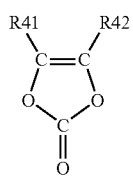

(7)

(R41 and R42 each represent a hydrogen group or an alkyl group.)

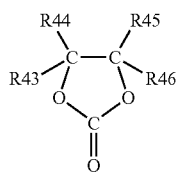

(8)

(R43 to R46 each represent a hydrogen group, an alkyl group, a vinyl group, or an allyl group and at least one of R43 to R46 is a vinyl group or an allyl group.)

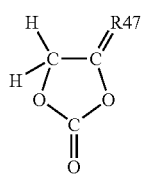

(9)

(R47 represents an alkylene group.)

The unsaturated carbon bond-containing cyclic carbonic acid ester represented by formula (7) is a vinylene carbonate compound. Examples of the vinylene carbonate compound include vinylene carbonate, methyl vinylene carbonate, ethyl vinylene carbonate, 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. Of these, vinylene carbonate is preferred. This is because it is highly available and achieves high effects.

The unsaturated carbon bond-containing cyclic carbonic acid ester represented by formula (8) is a vinyl ethylene carbonate compound. Examples of the vinyl ethylene carbonate compound include vinyl ethylene carbonate, 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one. Of these, vinyl ethylene carbonate is preferred. This is because it is highly available and achieves high effects. Naturally, R23 to R26 may all be vinyl groups or allyl groups or vinyl groups and allyl groups may be mixed.

The unsaturated carbon bond-containing cyclic carbonic acid ester represented by formula (9) is a methylene ethylene carbonate compound. Examples of the methylene ethylene carbonate compound include 4-methylene-1,3-dioxolan-2-one, 4,4-dimethyl-5-methylene-1,3-dioxolan-2-one, and 4,4-diethyl-5-methylene-1,3-dioxolan-2-one. The methylene ethylene carbonate compound may be a compound containing one methylene group (compound represented by formula (9)) or two methylene groups.

The unsaturated carbon bond-containing cyclic carbonic acid ester may be a catechol carbonate having a benzene ring or the like other than the compounds represented by formulae (7) to (9).

The solvent preferably contains at least one selected from a halogenated chain carbonic acid ester represented by formula (10) and a halogenated cyclic carbonic acid ester represented by formula (11). This is because decomposition reaction of the electrolyte is suppressed by the formation of a stable protective film on the electrode surface at the time of electrode reaction. The "halogenated chain carbonic acid ester" is a chain carbonic acid ester containing a halogen as a constitutional element. The "halogenated cyclic carbonic acid ester" is a cyclic carbonic acid ester containing a halogen as a constitutional element. R51 to R56 in formula (10) may be the same as or different from each other. The same applies to R57 to R60 in formula (11). The total content of the halogenated chain carbonic acid ester and the halogenated cyclic carbonic acid ester in the solvent is, for example, 0.01 wt % to 50 wt %. Note that the types of the halogenated chain carbonic acid ester and the halogenated cyclic carbonic acid ester are not limited to those described below and may be any other types.

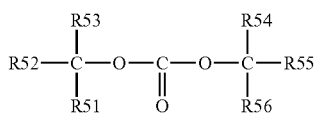
(10)

(R51 to R56 each represent a hydrogen group, a halogen group, an alkyl group, or a halogenated alkyl group and at least one of R51 to R56 is a halogen group or a halogenated alkyl group.)

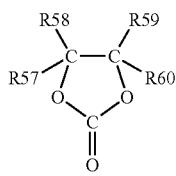
(11)

(R57 to R60 each represent a hydrogen group, a halogen group, an alkyl group, or a halogenated alkyl group and at least one of R57 to R60 is a halogen group or a halogenated alkyl group.)

The type of halogen is not particularly limited but is preferably fluorine, chlorine, or bromine. Fluorine is more preferred. This is because higher effects can be obtained compared to other halogens. The number of halogen atoms is preferably 2 rather than 1 and may be 3 or more. This is because the ability to form a protective film increases and a stronger and more stable protective film is formed, resulting in higher suppression of decomposition reaction of the electrolyte.

Examples of the halogenated chain carbonic acid ester include fluoromethyl methyl carbonate, bis(fluoromethyl) carbonate, and difluoromethyl methyl carbonate. Examples of the halogenated cyclic carbonic acid ester include those represented by formulae (11-1) to (11-21). The halogenated cyclic carbonic acid esters include geometric isomers. Of these, 4-fluoro-1,3-dioxolan-2-one represented by formula (11-1) and 4,5-difluoro-1,3-dioxolan-2-one represented by formula (11-3) are preferred and the latter is more preferred. As for 4,5-difluoro-1,3-dioxolan-2-one, cis isomers are preferred over trans isomers. This is because they are highly available and achieve high effects.

(11-1)

(11-2)

(11-3)

(11-4)

(11-5)

-continued

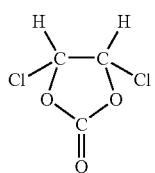 (11-6)

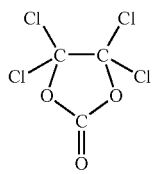 (11-7)

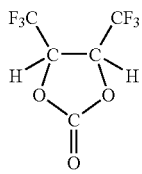 (11-8)

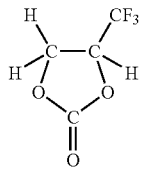 (11-9)

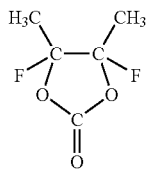 (11-10)

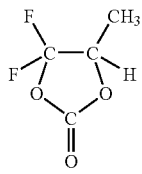 (11-11)

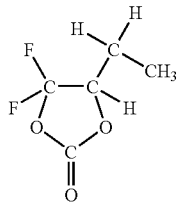 (11-12)

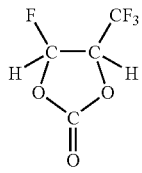 (11-13)

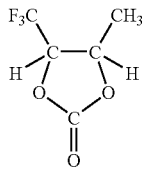 (11-14)

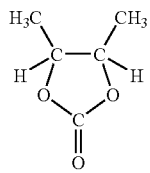 (11-15)

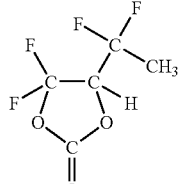 (11-16)

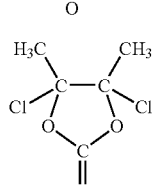 (11-17)

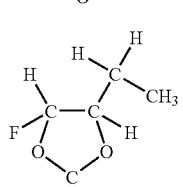 (11-18)

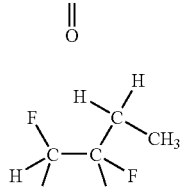 (11-19)

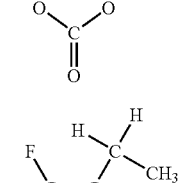 (11-20)

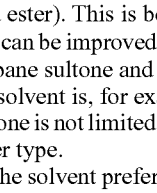 (11-21)

The solvent preferably contains a sultone (cyclic sulfonic acid ester). This is because chemical stability of the electrolyte can be improved further. Examples of the sultone include propane sultone and propene sultone. The sultone content in the solvent is, for example, 0.5 wt % to 5 wt %. The type of sultone is not limited to those described above and may be any other type.

The solvent preferably further contains an acid anhydride. This is because chemical stability of the electrolyte can be improved further. Examples of the acid anhydride include carboxylic anhydrides. Examples of the carboxylic anhydrides include succinic anhydride, glutaric anhydride, and maleic anhydride. The acid anhydride content in the solvent is, for example, 0.5 wt % to 5 wt %. The type of acid anhydride is not limited to those described above and may be any other type.

Electrolyte Salt

The electrolyte salt contains, for example, at least one light metal salt such as a lithium salt. The electrolyte salt may further contain, for example, salts other than salts of light metals.

Examples of the lithium salts include lithium hexafluorophosphate, lithium tetrafluoroborate, lithium perchlorate, lithium hexafluoroarsenate, lithium tetraphenylborate (LiB($C_6H_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), lithium bromide (LiBr), lithium monofluorophosphate (Li$_2$PFO$_3$), and lithium difluorophosphate (LiPF$_2$O$_2$). This is because electrochemical devices that use such electrolytes exhibit good characteristics. The type of electrolyte salt is not limited to those described above and may be any other type.

Of these, at least one selected from lithium hexafluorophosphate, lithium tetrafluoroborate, lithium perchlorate, and lithium hexafluoroarsenate is preferred and lithium hexafluorophosphate is more preferred. This is because the internal resistance decreases and higher effects are achieved.

In particular, the electrolyte salt preferably contains at least one selected from the compounds represented by formulae (12) to (14). This is because higher effects can be obtained. R61 and R63 in formula (12) may be the same as or different from each other. The same applies to R71 to R73 in formula (13) and R81 and R82 in formula (14). The type of electrolyte salt is not limited to those described below and may be any other type.

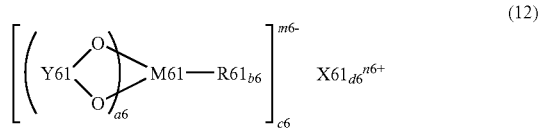

(12)

(X61 represents a group 1A or 2A element in the short-form periodic table or aluminum. M61 represents a transition metal or a group 3B, 4B, or 5B element in the short-form periodic table. R61 represents a halogen group. Y61 represents —C(=O)—R62-C(=O)—, —C(=O)—CR63$_2$-, or —C(=O)—C(=O)—, where R62 represents an alkylene group, a halogenated alkylene group, an arylene group, or a halogenated arylene group, R63 represents an alkyl group, a halogenated alkyl group, an aryl group, or a halogenated aryl group, a6 represents an integer of 1 to 4, b6 represents an integer of 0, 2, or 4, and c6, d6, m6, and n6 each represent an integer of 1 to 3.)

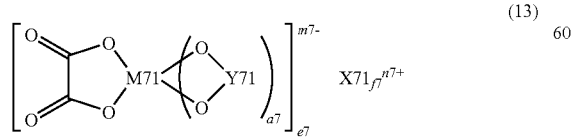

(13)

(X71 represents a group 1A or 2A element in the short-form periodic table. M71 represents a transition metal or a group 3B, 4B, or 5B element in the short-form periodic table. Y71 represents —C(=O)—(CR71$_2$)$_{b7}$-C(=O)—, —R73$_2$C—(CR72$_2$)$_{c7}$-C(=O)—, —R73$_2$C—(CR72$_2$)$_{c7}$-CR73$_2$-, —R73$_2$C—(CR72$_2$)$_{c7}$-S(=O)$_2$—, —S(=O)$_2$—(CR72$_2$)$_{d7}$-S(=O)$_2$—, or —C(=O)—(CR72$_2$)$_{d7}$-S(=O)$_2$— where R71 and R73 each represent a hydrogen group, an alkyl group, a halogen group, or a halogenated alkyl group and at least one of R71 and R73 is a halogen group or a halogenated alkyl group, R72 represents a hydrogen group, an alkyl group, a halogen group, or a halogenated alkyl group, a7, e7, and n7 each represent an integer of 1 or 2, b7 and d7 each represent an integer of 1 to 4, c7 represents an integer of 0 to 4, and f7 and m7 each represent an integer of 1 to 3.)

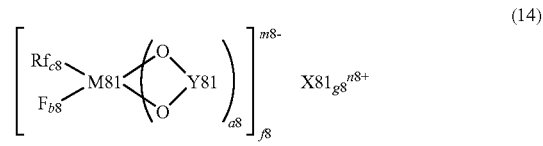

(14)

(X81 represents a group 1A or 2A element in the short-form periodic table. M81 represents a transition metal or a group 3B, 4B, or 5B element in the short-form periodic table. Rf represents a C1-C10 fluorinated alkyl group or a C1-C10 fluorinated aryl group. Y81 represents —C(=O)—(CR81$_2$)$_{d8}$-C(=O)—, —R82$_2$C—(CR81$_2$)$_{d8}$-C(=O)—, —R82$_2$C—(CR81$_2$)$_{d8}$-CR82$_2$-, —R82$_2$C—(CR81$_2$)$_{d8}$-S(=O)$_2$—, —S(=O)$_2$—(CR81$_2$)$_{e8}$-S(=O)$_2$—, or —C(=O)—(CR81$_2$)$_{e8}$-S(=O)$_2$— where R81 represents a hydrogen group, an alkyl group, a halogen group, or a halogenated alkyl group, R82 represents a hydrogen group, an alkyl group, a halogen group, or a halogenated alkyl group and at least one of R82s is a halogen group or a halogenated alkyl group, a8, f8, and n8 each represent an integer of 1 or 2, b8, c8, and e8 each represent an integer of 1 to 4, d8 represents an integer of 0 to 4, and g8 and m8 each represent an integer of 1 to 3.)

Examples of the group 1A element include hydrogen, lithium, sodium, potassium, rubidium, cesium, and francium. Examples of the group 2A element include beryllium, magnesium, calcium, strontium, barium, and radium. Examples of the group 3B element include boron, aluminum, gallium, indium, and thallium. Examples of the group 4B element include carbon, silicon, germanium, tin, and lead. Examples of the group 5B element include nitrogen, phosphorus, arsenic, antimony, and bismuth.

Examples of the compound represented by formula (12) include compounds represented by formulae (12-1) to (12-6). Examples of the compound represented by formula (13) include compounds represented by formulae (13-1) to (13-8). Examples of the compound represented by formula (14) include a compound represented by formula (14-1).

(12-1)

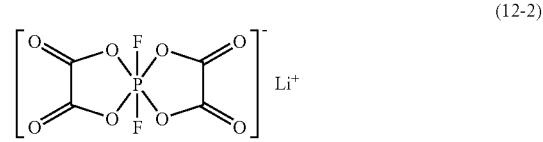

(12-2)

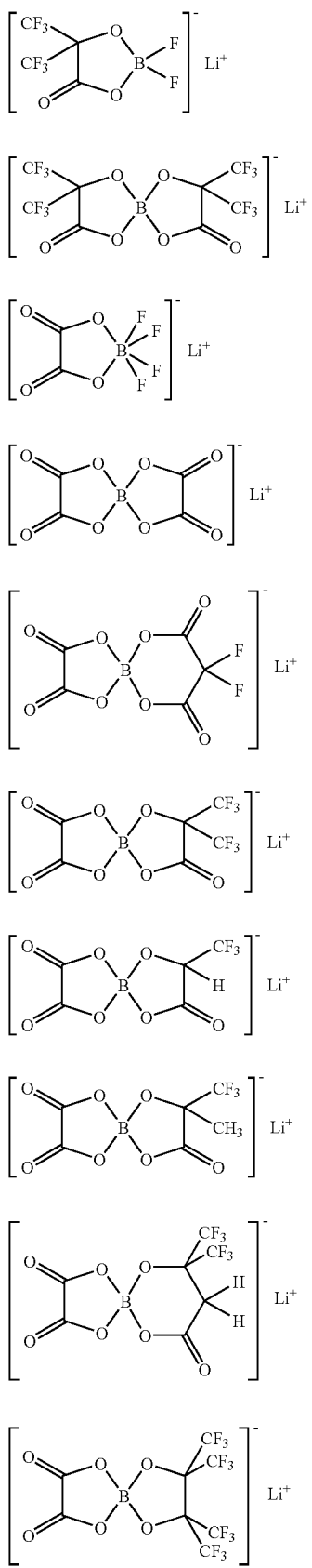

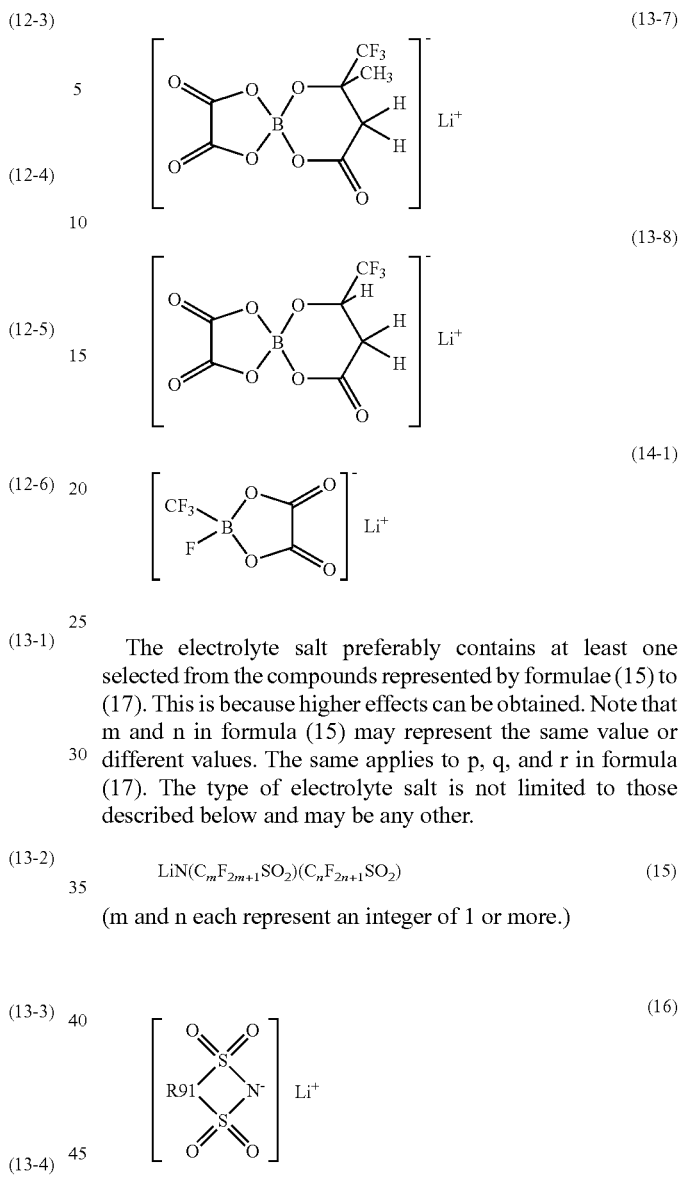

The electrolyte salt preferably contains at least one selected from the compounds represented by formulae (15) to (17). This is because higher effects can be obtained. Note that m and n in formula (15) may represent the same value or different values. The same applies to p, q, and r in formula (17). The type of electrolyte salt is not limited to those described below and may be any other.

$$LiN(C_mF_{2m+1}SO_2)(C_nF_{2n+1}SO_2) \tag{15}$$

(m and n each represent an integer of 1 or more.)

(R91 represents a C2-C4 linear or branched perfluoroalkylene group.)

$$LiC(C_pF_{2p+1}SO_2)(C_qF_{2q+1}SO_2)(C_rF_{2r+1}SO_2) \tag{17}$$

(p, q, and r each represent an integer of 1 or more.)

The compound represented by formula (15) is a chain imide compound. Examples of this compound include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), and lithium (trifluoromethanesulfonyl)(nonafluorobutanesulfonyl)imide (LiN(CF$_3$SO$_2$)(C$_4$F$_9$SO$_2$)).

The compound represented by formula (16) is a cyclic imide compound. Examples of this compound include those represented by formulae (16-1) to (16-4).

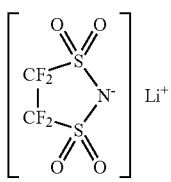 (16-1)

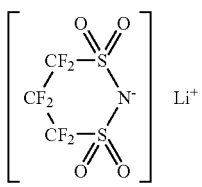 (16-2)

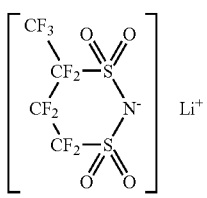 (16-3)

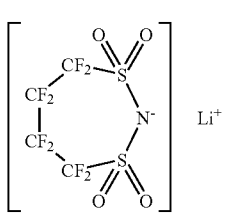 (16-4)

The compound represented by formula (17) is a chain methide compound. An example of this compound is lithium tris(trifluoromethanesulfonyl)methide ($LiC(CF_3SO_2)_3$).

The electrolyte salt content is preferably 0.3 mol/kg to 3.0 mol/kg with respect to the solvent. This is to achieve a high ion conductivity.

According to this electrolyte, the solvent contains at least one selected from ester compounds, lithium monofluorophosphate, and lithium difluorophosphate, and at least one anhydrous compound. This improves chemical stability of the electrolyte compared to when the solvent contains neither the ester compound or the like nor the anhydrous compound or when the solvent contains only one of the ester compound or the like and the anhydrous compound. Accordingly, since decomposition reaction of the electrolyte at the time of electrode reactions is suppressed, performance of electrochemical devices that use the electrolyte can be improved.

In particular, when the content of at least one selected from the ester compound, lithium monofluorophosphate, and lithium difluorophosphate is 0.001 wt % to 10 wt % in the solvent, higher effects can be achieved. When the anhydrous compound content in the solvent is 0.01 wt % to 1 wt %, higher effects can be achieved.

When the solvent contains a phosphoric acid compound, higher effects can be achieved.

Higher effects can be achieved when the solvent contains at least one selected from an unsaturated carbon bond-containing cyclic carbonic acid ester, a halogenated chain carbonic acid ester, a halogenated cyclic carbonic acid ester, a sultone, and an acid anhydride. Higher effects can be achieved when the electrolyte salt contains at least one selected from lithium hexafluorophosphate, lithium tetrafluoroborate, lithium perchlorate, lithium hexafluoroarsenate, and compounds represented by formulae (12) to (17).

2. Electrochemical Devices (Secondary Batteries) Using the Electrolyte

Next, examples of using the electrolyte described above are described. A secondary battery is used as an example of the electrochemical device. The electrolyte described above is used as follows.

2-1. First Secondary Battery

Figure 2:
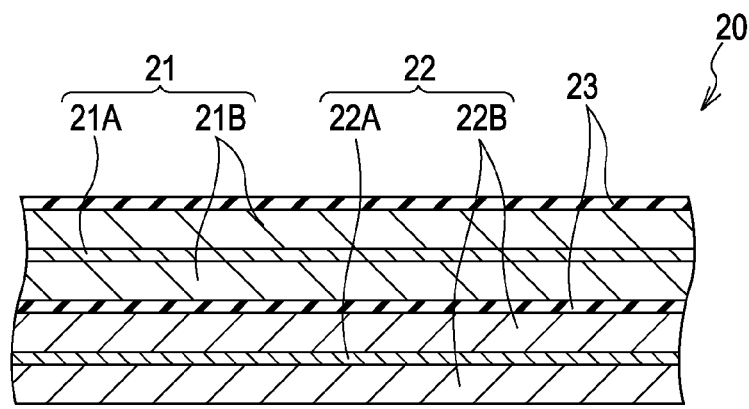
FIG. 2 is an enlarged cross-sectional view of a part of a wound electrode body shown in FIG. 1.

FIGS. 1 and 2 show cross-sectional structures of a first secondary battery. FIG. 2 is an enlarged view of a part of a wound electrode body 20 shown in FIG. 1. The secondary battery described herein is, for example, a lithium ion secondary battery in which the capacity of the negative electrode is indicated by occlusion and release of lithium ions that serve as an electrode reactant.

Overall Structure of the Secondary Battery

This secondary battery includes a substantially hollow-cylinder-shaped battery can 11 containing the wound electrode body 20 and a pair of isolators 12 and 13. A battery structure that uses such a battery can 11 is called a cylindrical type.

The battery can 11 has, for example, a hollow structure having one end closed and the other end open and is composed of iron, aluminum, an alloy thereof, or the like. When the battery can 11 is composed of iron, the surface of the battery can 11 may be plated with nickel, for example. The pair of isolators 12 and 13 sandwich the wound electrode body 20 in a vertical direction and extend perpendicularly with respect to the wound peripheral surface of the wound electrode body 20.

A battery lid 14, a safety valve mechanism 15, and a thermosensitive resistor (positive temperature coefficient (PCT) element) 16 are caulked at the open end of the battery can 11 through a gasket 17 and the battery can 11 is thereby sealed. The battery lid 14 is composed of the same material as the battery can 11, for example. The safety valve mechanism 15 and the thermosensitive resistor 16 are provided at the inner side of the battery lid 14. The safety valve mechanism 15 is electrically connected to the battery lid 14 through the thermosensitive resistor 16. The safety valve mechanism 15 is configured such that when the internal pressure reaches a particular level or higher due to internal shorts, heat from outside, etc., a disk 15A is reversed to cut the electrical connection between the battery lid 14 and the wound electrode body 20. The thermosensitive resistor 16 prevents abnormal heat generation caused by high current since its resistance increases (thereby restricting the current) with the increase in temperature. The gasket 17 is composed of, for example, an insulating material and the surface thereof is coated with, for example, asphalt.

The wound electrode body 20 includes a positive electrode 21 and a negative electrode 22 laminated with a separator 23 therebetween and wound. A center pin 24 may be inserted into the center of the wound electrode body 20. In the wound electrode body 20, a positive electrode lead 25 composed of aluminum or the like is connected to the positive electrode 21, and a negative electrode lead 26 composed of nickel or the like is connected to the negative electrode 22. The positive electrode lead 25 is electrically connected to the battery lid 14 by being welded to the safety valve mechanism 15, for example. The negative electrode lead 26 is electrically connected to the battery can 11 by being welded thereto, for example.

Positive Electrode

The positive electrode 21 includes, for example, a positive electrode collector 21A and positive electrode active material layers 21B formed on both sides of the positive electrode collector 21A. Alternatively, the positive electrode active material layer 21B may be disposed on only one side of the positive electrode collector 21A.

The positive electrode collector 21A is composed of, for example, aluminum, nickel, or stainless steel.

The positive electrode active material layer 21B contains a positive electrode active material which is at least one positive electrode material that can occlude and release lithium ions. The positive electrode active material layer 21B may further contain other materials such as a positive electrode binder and a positive electrode conductant agent if necessary.

The positive electrode material is preferably a lithium-containing compound since a high energy density can be achieved. Examples of the lithium-containing compound include a complex oxide containing lithium and a transition metal element as constitutional elements and a phosphoric acid compound containing lithium and a transition metal element as constitutional elements. In particular, a compound containing at least one selected from cobalt, nickel, manganese, and iron as the transition metal element is preferred since a higher voltage can be obtained. The chemical formula therefor is, for example, $Li_xM1O_2$ or $Li_yM2PO_4$. In the formula, M1 and M2 each represent at least one transition metal element. The values of x and y vary depending on the charge/discharge state but are usually $0.05 \leq x \leq 1.10$ and $0.05 \leq y \leq 1.10$.

Examples of the complex oxide containing lithium and a transition metal element include lithium-cobalt complex oxide ($Li_xCoO_2$), lithium-nickel complex oxide ($Li_xNiO_2$), and lithium-nickel complex oxides represented by formula (18). Examples of the phosphoric acid compound containing lithium and a transition metal element include lithium-iron phosphoric acid compound ($LiFePO_4$) and lithium-iron-manganese phosphoric acid compound ($LiFe_{1-u}Mn_uPO_4$ (u<1)). This is because good cycle characteristics can be obtained as well as a high battery capacity.

$$LiNi_{1-x}M_xO_2 \quad (18)$$

(M is at least one selected from cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium. X satisfies $0.005<x<0.5$.)

Other examples of the positive electrode material include oxides, disulfides, chalcogenides, and electrically conductive polymers. Examples of the oxides include titanium oxide, vanadium oxide, and manganese dioxide. Examples of the disulfides include titanium disulfide and molybdenum sulfide. Examples of the chalcogenides include niobium selenide. Examples of the electrically conductive polymers include sulfur, polyaniline, and polythiophene.

The positive electrode material may be any other material. A series of positive electrode materials described above may be used as a mixture of any combination of two or more types.

Examples of the positive electrode binder include synthetic rubber such as styrene-butadiene rubber, fluorine rubber, and ethylene-propylene-diene and polymer materials such as polyvinylidene fluoride. These may be used alone or in combination.

Examples of the positive electrode conductant agent include carbon materials such as graphite, carbon black, acetylene black, and Ketjen black. These may be used alone or in combination. The positive electrode conductant agent may be a metal material or electrically conductive polymer as long as the material has electrical conductivity.

Negative Electrode

The negative electrode 22 includes, for example, a negative electrode collector 22A and negative electrode active material layers 22B formed on both sides of the negative electrode collector 22A. Alternatively, the negative electrode active material layer 22B may be disposed on only one side of the negative electrode collector 22A.

The negative electrode collector 22A is composed of, for example, copper, nickel, or stainless steel. The surface of the negative electrode collector 22A is preferably roughened. This is because a so-called "anchoring effect" helps improve adhesiveness of the negative electrode active material layers 22B to the negative electrode collector 22A. In such a case, the surface of the negative electrode collector 22A may be roughened at least in a region that opposes the negative electrode active material layer 22B. The method of roughening the surface may be, for example, a method for forming fine particles by an electrolytic process. The electrolytic process is a process of forming irregularities by forming fine particles on the surface of the negative electrode collector 22A by an electrolytic process in an electrolytic cell. A copper foil produced by an electrolytic process is generally called "electrolytic copper foil".

The negative electrode active material layer 22B contains a negative electrode active material which is at least one negative electrode material that can occlude and release lithium ions. The negative electrode active material layer 22B may further contain other materials such as a negative electrode binder and a negative electrode conductant agent if necessary. The details of the negative electrode binder and the negative electrode conductant agent are the same as those of the positive electrode binder and the positive electrode conductant agent, respectively, for example. For this negative electrode active material layer 22B, for example, the chargeable capacity of the negative electrode material is preferably larger than the discharge capacity of the positive electrode 21 in order to prevent unintended precipitation of lithium metal during charge/discharge operation.

Examples of the negative electrode material include carbon materials. Carbon materials undergo significantly small changes in crystal structure during occlusion and release of lithium ions and thus a high energy density and good cycle characteristics can be obtained. The carbon materials also function as negative electrode conductant agents. Examples of the carbon material include graphitizable carbon, non-graphitizable carbon having a (002) plane spacing of 0.37 nm or more, and graphite having a (002) plane spacing of 0.34 nm or less. In particular, pyrolytic carbons, cokes, glassy carbon fibers, organic polymer compound sinters, activated carbon, and carbon blacks can be named. Of these, cokes include pitch cokes, needle cokes, and petroleum cokes. The organic polymer compound sinters refer to phenol or furan resins carbonized by firing at a suitable temperature. The form of the carbon material may be fibrous, spherical, granular, or scaly.

The negative electrode material may be a material (metal-based material) containing at least one selected from metal and semimetal elements as a constitutional element. This is because a high energy density is achieved. This material may be a metal or semimetal element in the form of a single element, an alloy, or a compound, may contain two or more of such metal and/or semimetal elements, or may at least partly include a phase containing one or more of such metal and/or semimetal elements. For the purpose of this specification, "alloy" refers to not only a material that contains two or more metal elements but also a material that contains at least one metal element and at least one semimetal element. The "alloy" may also contain a non-metal element. The structure thereof may be a solid solution, a eutectic crystal (eutectic mixture), an intermetallic compound, or a combination of two or more of the foregoing.

The metal or semimetal element described above is a metal or semimetal element that can be alloyed with lithium and that is at least one selected from the following elements: magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium, palladium (Pd), and platinum (Pt). Among these, at least one of silicon and tin is preferred. This is because silicon and tin have superb capacity to occlude and release lithium ions and help achieve a high energy density.

A material containing at least one of silicon and tin may be silicon or tin in the form of a single element, an alloy, or a compound, may contain two or more of such silicon and tin, or may at least partly include a phase containing one or more of such silicon and tin.

Examples of the silicon alloy include those alloys that contain at least one of the following elements as a constitutional element other than silicon: tin, nickel, copper, iron, cobalt, manganese, zinc, indium, silver, titanium, germanium, bismuth, antimony, and chromium. Examples of the silicon compound include compounds that contain oxygen and/or carbon as a constitutional element other than silicon. The silicon compound may contain, as a constitutional element other than silicon, at least one of the elements described with reference to the silicon alloy.

Examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), and LiSiO.

Examples of the tin alloy include those alloys that contain at least one of the following elements as a constitutional element other than tin: silicon, nickel, copper, iron, cobalt, manganese, zinc, indium, silver, titanium, germanium, bismuth, antimony, and chromium. Examples of the tin compound include compounds containing oxygen and/or carbon. The tin compound may contain, as a constitutional element other than tin, at least one of the elements described with reference to the tin alloy. Examples of the tin alloy and the tin compound include $SnSiO_3$, LiSnO, and $Mg_2Sn$.

In particular, the material containing silicon is preferably silicon in the form of a single element, for example, since a high battery capacity and good cycle characteristics can be obtained. Note that the term "single element" is used here in general context (trace amounts of impurities may be present) and does not always mean that the purity is 100%.

The material containing tin is preferably a material that contains a second constitutional element and a third constitutional element in addition to tin as a first constitutional element, for example. The second constitutional element is, for example, at least one selected from the following elements: cobalt, iron, magnesium, titanium, vanadium, chromium, manganese, nickel, copper, zinc, gallium, zirconium, niobium, molybdenum, silver, indium, cerium (Ce), hafnium, tantalum, tungsten (W), bismuth, and silicon. The third constitutional element is, for example, at least one selected from boron, carbon, aluminum, and phosphorus. When the second and third constitutional elements are contained, a high battery capacity and good cycle characteristics can be obtained.

In particular, a material containing tin, cobalt, and carbon (SnCoC-containing material) is preferable. As for the composition of the SnCoC-containing material, the carbon content is, for example, 9.9 mass % to 29.7 mass % and the ratio of the cobalt content to the total content of tin and cobalt (Co/(Sn+Co)) is 20 mass % to 70 mass %. A high energy density can be obtained within such a compositional range.

The SnCoC-containing material has a phase containing tin, cobalt, and carbon. This phase preferably has a low crystallinity or is amorphous. This phase is a reactive phase that can react with lithium and presence of the reactive phase helps achieve good characteristics. The half width of the diffraction peak obtained by analyzing the phase by X-ray diffraction is preferably 1.0° or more in terms of a 2θ diffraction angle when a CuKα line is used as a characteristic X-ray at a sweep rate of 1°/min. This is because lithium ions can be occluded and released more smoothly and the reactivity with the electrolyte and the like decreases. Note that the SnCoC-containing material sometimes contains phases that contain the constitutional elements in the form of a single element or that contain some of the constitutional elements in addition to the low crystallinity or amorphous phase.

Whether or not the diffraction peak obtained by the X-ray diffraction corresponds to the reactive phase that can react with lithium can be easily determined by comparing the X-ray diffraction charts before and after the electrochemical reaction with lithium. For example, if the position of the diffraction peak changes between before and after the electrochemical reaction with lithium, the peak corresponds to the reactive phase that can react with lithium. In such a case, for example, the diffraction peak of the low-crystallinity or amorphous reactive phase is observed at 2θ=20° to 50°. This reactive phase, for example, contains the constitutional elements described above and presumably has a low crystallinity or is amorphous because of the presence of carbon.

In the SnCoC-containing material, at least part of atoms of carbon serving as a constitutional element are preferably bonded to another constitutional element, i.e., a metal or semimetal element. This is because aggregation or crystallization of tin is suppressed. The state of bonding between elements can be confirmed through X-ray photoelectron spectroscopy (XPS), for example. In a commercially available device, an Al—Kα line, a Mg—Kα line, or the like is used as a soft X-ray, for example. When at least part of atoms of carbon are bonded with a metal or semimetal element or the like, the peak of the composite wave of the carbon is orbital (C is) appears in a region lower than 284.5 eV. It should be noted that the energy calibration has been set so that the peak of the 4f orbital of gold atoms (Au4f) appears at 84.0 eV. During this operation, since surface-contaminating carbon is usually present on a surface of a material, the C1s peak of the surface-contaminating carbon is set at 284.8 eV and used as the energy reference. In XPS analysis, the waveform of the C1s peak is obtained as a combination of the peak of the surface-contaminating carbon and the peak of carbon contained in the SnCoC-containing material. Thus, the two peaks are separated by analysis using commercially available software, for example. In the waveform analysis, the position of the main peak at the lowest binding energy side is used as the energy reference (284.8 eV).

The SnCoC-containing material may include other constitutional elements if necessary. At least one element selected from silicon, iron, nickel, chromium, indium, niobium, germanium, titanium, molybdenum, aluminum, phosphorus, gallium, and bismuth is an example of such constitutional elements.

In addition to the SnCoC-containing material, a material containing tin, cobalt, iron, and carbon (SnCoFeC-containing material) is also preferable. The composition of the SnCoFeC-containing material may be freely set. For example, the following composition can be employed when the iron content is to be set low: 9.9 mass % to 29.7 mass % carbon and 0.3 mass % to 5.9 mass % iron with the ratio of cobalt content to the total content of tin and cobalt (Co/(Sn+Co)) being 30 mass % to 70 mass %. For example, the following composition can be employed when the iron content is to be set high: 11.9 mass % to 29.7 mass % carbon with the ratio of the total content of iron and cobalt to the total content of tin, cobalt, and iron ((Co+Fe)/(Sn+Co+Fe)) being 26.4 mass % to 48.5 mass % and the ratio of the cobalt content to the total content of cobalt and iron (Co/(Co+Fe)) being 9.9 mass % to 79.5 mass %. A high energy density can be obtained within such compositional ranges. The physical properties (such as the half width) of the SnCoFeC-containing material are the same as those of the SnCoC-containing material described above.

Examples of other negative electrode material include metal oxides and polymer compounds. Examples of the metal oxides include iron oxide, ruthenium oxide, and molybdenum oxide. Examples of the polymer compound include polyacetylene, polyaniline, and polypyrrole.

Naturally, the negative electrode material may be any other materials. A series of negative electrode active materials described above may be used as a mixture of any two or more types.

The negative electrode active material layers 22B are formed by, for example, any one of an application method, a vapor phase method, a liquid phase method, a thermal spraying method, and a baking method (sintering method), or any combination of these method. The application method involves mixing a negative electrode active material in a particle form with a binder and the like, dispersing the resulting mixture into a solvent, and applying the resulting dispersion. Examples of the vapor phase method include a physical vapor deposition method and a chemical vapor deposition method. Specific examples thereof include a vacuum vapor deposition method, a sputtering method, an ion plating method, a laser ablation method, a thermochemical vapor deposition method and a plasma-enhanced chemical vapor deposition method. Examples of the liquid phase method include an electrolytic plating method and an electroless plating method. The thermal spraying method involves spraying a negative electrode active material in a molten or semi-molten state. The baking method involves, for example, performing application by the same process as the application method and then heating the applied dispersion at a temperature higher than the melting temperature of the binder or the like. A common technique can be employed for the baking method. Examples thereof include an atmospheric baking method, a reactive baking method, and a hot-press baking method.

The negative electrode active material is, for example, in the form of particles. In such a case, the negative electrode active material layer 22B contains particles of a negative electrode active material (simply referred to as "negative electrode active material particles" hereinafter). When the negative electrode active material layer 22B is formed by an application method or the like, the negative electrode active material particles are the negative electrode active material in a particle form used for preparing a slurry for application. In contrast, when the negative electrode active material layer 22B is formed by a vapor phase method or a thermal spraying method, the negative electrode active material particles are particles of the negative electrode active material deposited on the negative electrode collector 22A by evaporation or melting.

When the negative electrode active material particles are formed by a deposition method such as a vapor phase method, the negative electrode active material particles may have a single-layer structure formed by a single deposition process or a multilayer structure formed by conducting a deposition process a plurality of times. However, when an evaporation method that involves high-temperatures during deposition is used, the negative electrode active material particles preferably have a multilayer structure. This is because the time for which the negative electrode collector 22A is exposed to high temperatures is shorter when the deposition of the negative electrode material is conducted over a plurality of times (the thickness of the negative electrode material deposited each time is smaller) than when the deposition is conducted in one step. As a result, the negative electrode collector 22A is less likely to be damaged by heat.

The negative electrode active material particles grow in the thickness direction of the negative electrode active material layer 22B from the surface of the negative electrode collector 22A and are preferably connected to the negative electrode collector 22A at their bases. This is because expansion and contraction of the negative electrode active material layer 22B are suppressed during charge/discharge operation. The negative electrode active material particles are preferably formed by a vapor phase method, a liquid phase method, a baking method, or the like and are preferably alloyed with at least part of the interface with the negative electrode collector 22A. In this case, the constitutional elements of the negative electrode collector 22A may be diffused into the negative electrode active material particles, the constitutional elements of the negative electrode active material particles may be diffused into the negative electrode collector 22A, or the constitutional elements of the negative electrode collector 22A and the negative electrode active material particles may be interdiffused at the interface.

In particular, the negative electrode active material layer 22B preferably includes an oxide-containing film coating the surfaces of the negative electrode active material particles (the portions of the negative electrode active material particles that come into contact with the electrolyte if not for the oxide-containing film), if occasion demands. This is because the oxide-containing film serves as a protective film against the electrolyte and the decomposition reaction of the electrolyte can be suppressed during charge/discharge operation. As a result, the cycle characteristics, the storage characteristics, and the like improve. The oxide-containing film may coat the entire surfaces or part of the surfaces of the negative electrode active material particles. Preferably, the entire surfaces are coated. This is because the decomposition reaction of the electrolyte can be suppressed further.

The oxide-containing film contains, for example, at least one selected from a silicon oxide, a germanium oxide, and a tin oxide and preferably contains a silicon oxide. This is because it becomes easier to coat the entire surfaces of the negative electrode active material particles and good protection can be achieved. Naturally, the oxide-containing film may contain any other oxide.

The oxide-containing film is formed by, for example, a vapor phase method or a liquid phase method but is preferably formed by a liquid phase method. This is because it becomes easier to coat a wide range of the negative electrode active material particle surfaces. Examples of the liquid phase method include a liquid phase precipitation method, a sol-gel method, an application method and a dip-coating method. Of these, the liquid phase precipitation method, the sol-gel method, and the dip-coating method are preferred, and the liquid phase precipitation method is more preferred. This is because higher effects can be obtained. The oxide-containing film may be formed by one or more forming methods among a series of forming methods described above.

If occasion demands, the negative electrode active material layer 22B preferably contains a metal material containing as a constitutional element a metal element that does not alloy with lithium, the metal material occupying voids inside the negative electrode active material layer 22B (hereinafter this metal material is simply referred to as "metal material"). This is because the negative electrode active material particles become bonded to each other through the metal material, the void ratio in the negative electrode active material layer 22B decreases, and thus expansion and contraction of the negative electrode active material layer 22B are suppressed. As a result, the cycle characteristics, the storage characteristics, and the like improve. Note that the details of the "voids inside the negative electrode active material layer 22B" are described below (refer to FIGS. 5A to 6B).

The metal element is, for example, at least one selected from the group consisting of iron, cobalt, nickel, zinc, and copper and is preferably cobalt. This is because the metal material can easily enter the voids inside the negative electrode active material layer 22B and exhibits a good bonding effect. Naturally, the metal element may be any other metal element. For the purpose of this specification, the term "metal material" is not limited to a single element and represents a wide concept including alloys and metal compounds.

The metal material is formed by, for example, a vapor phase method or a liquid phase method but is preferably formed by a liquid phase method. This is because the metal material can easily enter the voids inside the negative electrode active material layer 22B. The liquid phase method may be an electrolytic plating method or an electroless plating method but is preferably an electrolytic plating method. This is because it is easier for the metal material to enter the voids and the time taken for the fabrication can be made shorter. The metal material may be formed by employing one or more forming methods among a series of forming methods described above.

The negative electrode active material layer 22B may include one or both of the oxide-containing film and the metal material. Preferably, both are included to improve the cycle characteristics and the like. If only one of them is to be included, the oxide-containing film is preferably included to improve the cycle characteristics and the like. When both the oxide-containing film and the metal material are included, either one may be formed first. Preferably, the oxide-containing film is formed first to further improve the cycle characteristics and the like.

The detailed structure of the negative electrode 22 will now be described with reference to FIGS. 3 to 6B.

Figure 3:
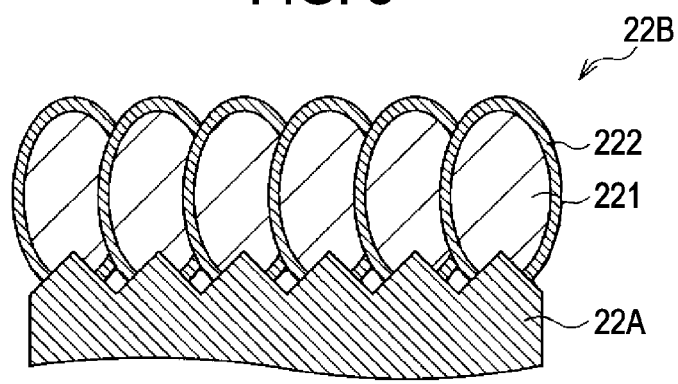
FIG. 3 is a schematic cross-sectional view showing the structure of a negative electrode shown in FIG. 2.
Figure 4:
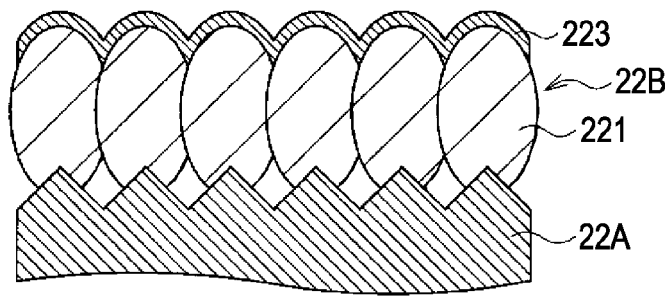
FIG. 4 is a schematic cross-sectional view showing another structure of the negative electrode shown in FIG. 2.

First, the case in which the negative electrode active material layer 22B includes negative electrode active material particles and an oxide-containing film is described. FIGS. 3 and 4 are schematic diagrams showing cross-sectional structures of the negative electrode 22. The drawings show the case in which the negative electrode active material particles have a single-layer structure.

In the case shown in FIG. 3, negative electrode active material particles 221 are formed on the negative electrode collector 22A by depositing a negative electrode material on the negative electrode collector 22A by, for example, a vapor phase method such as a vapor deposition method. In this case, when the surface of the negative electrode collector 22A is roughened and has protrusions (e.g., fine particles formed by an electrolytic process), the negative electrode active material particles 221 grow in the thickness direction for every protrusion. Thus, the negative electrode active material particles 221 align on the negative electrode collector 22A and the bases thereof are bonded to the negative electrode collector 22A. When an oxide-containing film 222 is subsequently formed on the surfaces of the negative electrode active material particles 221 by, for example, a liquid phase method such as a liquid phase precipitation method, the oxide-containing film 222 coats substantially the entire surfaces of the negative electrode active material particles 221. In this case, a wide range extending from the top to the bottom of the negative electrode active material particles 221 can be coated. Such a wide-range coating state is a feature achieved when the oxide-containing film 222 is formed by a liquid phase method. In other words, when the oxide-containing film 222 is formed by a liquid phase method, the coating effect reaches not only the top of the negative electrode active material particles 221 but also the bases of the negative electrode active material particles 221 so that even the bases are coated with the oxide-containing film 222.

In contrast, in the case shown in FIG. 4, only part (top) of the negative electrode active material particles 221 is coated with an oxide-containing film 223 since the oxide-containing film 223 is formed by a vapor phase method after the negative electrode active material particles 221 are formed by a vapor phase method. Such a narrowly coated state is a feature achieved when the oxide-containing film 223 is formed by a vapor phase method. In other words, when the oxide-containing film 223 is formed by a vapor phase method, the coating effect reaches the top of the negative electrode active material particles 221 but not the base, and the bases remain uncoated with the oxide-containing film 223.

Although FIG. 3 illustrates the cases in which the negative electrode active material layer 22B is formed by a vapor phase method, the same result can be obtained when the negative electrode active material layer 22B is formed by other methods such as an application method or a baking method. That is, the oxide-containing film 222 coating substantially the entire surfaces of the negative electrode active material particles is formed.

Figure 5A:
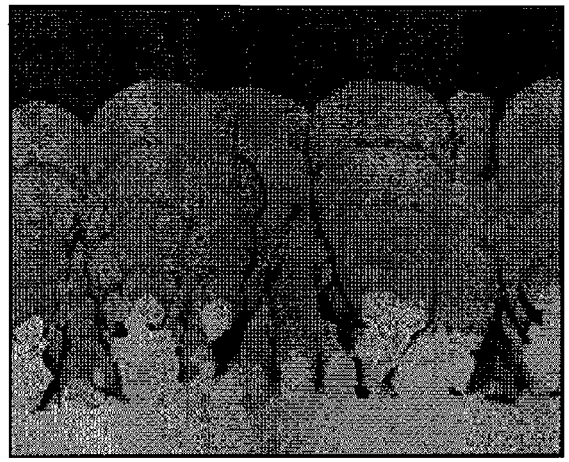
FIG. 5A is a scanning electron microscope (SEM) photograph showing a cross-sectional structure of the negative electrode shown in FIG. 2
Figure 5B:
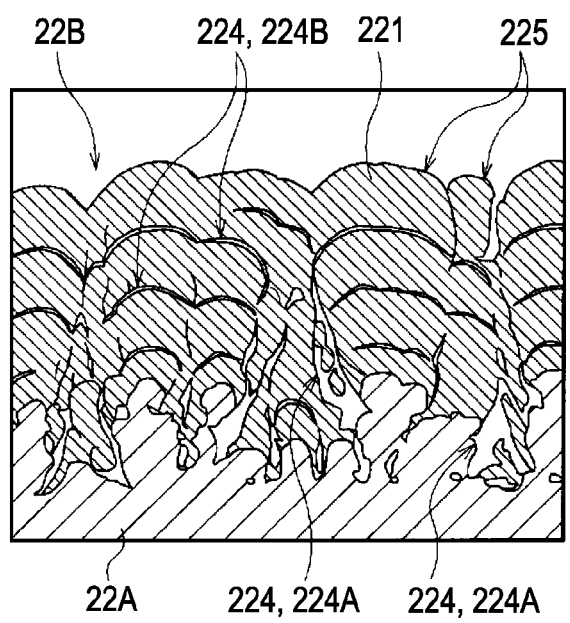
FIG. 5B is a schematic presentation of the SEM photograph shown in FIG. 5A.
Figure 6A:
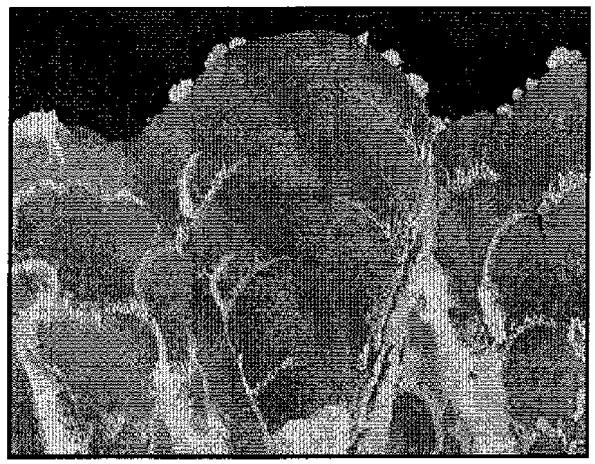
FIG. 6A is a SEM photograph showing another cross-sectional structure of the negative electrode shown in FIG. 2
Figure 6B:
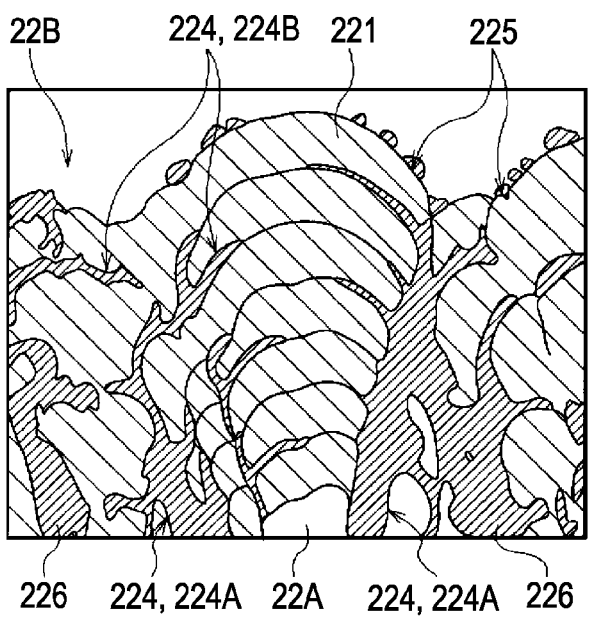
FIG. 6B is a schematic presentation of the SEM photograph shown in FIG. 6A.

Next, the case in which the negative electrode active material layer 22B includes negative electrode active material particles and a metal material is described. FIGS. 5A, 5B, 6A, and 6B are enlarged views of cross-sectional structures of the negative electrode 22. FIGS. 5A and 6A are each a photograph (secondary electron image) taken with a scanning electron microscope (SEM) and FIGS. 5B and 6B are each a schematic presentation of the SEM photograph shown in FIG. 5A or 6A. The drawings show the case in which the negative electrode active material particles 221 have a multilayer structure.

As shown in FIGS. 5A and 5B, when the negative electrode active material particles 221 have a multilayer structure, a plurality of voids 224 are generated inside the negative electrode active material layer 22B due to the alignment structure, the multilayer structure, and the surface structure of the particles. The voids 224 include mainly two types of voids 224A and 224B classified according to the cause of generation. The voids 224A are generated between the negative electrode active material particles 221 and the voids 224B are generated between layers in the negative electrode active material particles 221. Other types of voids 224 generated by other causes may also be present.

In some cases, gaps 225 are generated in exposed surfaces (outermost surfaces) of the negative electrode active material particles 221. Such gaps 225 are generated between whisker-like fine projections (not shown) generated on the surfaces of the negative electrode active material particles 221. The gaps 225 may be generated across the exposed surfaces of the negative electrode active material particles 221 in some cases and only partially in other cases. Since the whisker-like projections occur on the surfaces of the negative electrode active material particles 221 each time formation of the negative electrode active material particles 221 is conducted, the gaps 225 sometimes occur not only on the exposed surfaces of the negative electrode active material particles 221 but also between the layers.

As shown in FIGS. 6A and 6B, the negative electrode active material layer 22B includes a metal material 226 in the voids 224A and 224B. In this case, the metal material 226 may be contained in one of the voids 224A and 224B but is preferably contained in both the voids 224A and 224B. This is because higher effects can be obtained.

The metal material 226 is in the voids 224A between the negative electrode active material particles 221. In particular, when the negative electrode active material particles 221 are formed by a vapor phase method or the like, the negative electrode active material particles 221 grow for every protrusion present on the surface of the negative electrode collector 22A, as mentioned earlier. Thus, the voids 224A are generated between the negative electrode active material particles 221. The voids 224A cause the bonding property of the negative electrode active material layer 22B to decrease. Thus, in order to enhance the bonding property, the voids 224A are filled with the metal material 226. In this case, it is sufficient if just part of the voids 224A is filled but the amount of the voids 224A filled is preferably as large as possible. This is to enhance the bonding property of the negative electrode active material layer 22B. The proportion of the voids filled with the metal material 226 (filling percentage) is preferably 20% or more, more preferably 40% or more, and most preferably 80% or more.

The metal material 226 also enters the voids 224B inside the negative electrode active material particles 221. To be more specific, when the negative electrode active material particles 221 have a multilayer structure, the voids 224B are generated between the layers. As with the voids 224A, the voids 224B also cause the bonding property of the negative electrode active material layer 22B to decrease. Thus, in order to enhance the bonding property, the voids 224B are filled with the metal material 226. In this case, it is sufficient if just part of the voids 224B is filled but the amount of the voids 224B filled is preferably as large as possible. This is to enhance the bonding property of the negative electrode active material layer 22B.

In order to suppress adverse effects on the performance of the secondary battery by the whisker-like fine projections (not shown) on the exposed surfaces of the uppermost layers of the negative electrode active material particles 221, the negative electrode active material layer 22B may include the metal material 226 in the gaps 225. In particular, when the negative electrode active material particles 221 are formed by a vapor phase method, whisker-like fine projections occur at their surfaces and gaps 225 are formed between the projections. The gaps 225 increases the surface area of the negative electrode active material particles 221 as well as the amount of the irreversible coatings formed on their surfaces, possibly resulting in a decrease in extent of charge/discharge reaction. Thus, to suppress a decrease in extent of charge/discharge reaction, the gaps 225 are filled with the metal material 226. In this case, it is sufficient if just part of the gaps 225 is filled but the amount of the gaps 225 filled is preferably as large as possible. This is to further suppress the decrease in extent of charge/discharge reaction. As shown in FIGS. 6A and 6B, the metal material 226 is interspersed on the surfaces of the uppermost layers of the negative electrode active material particles 221. This shows that the above-mentioned fine projections are present at these spots. Naturally, it is not essential that the metal material 226 be interspersed on the surfaces of the negative electrode active material particles 221. The metal material 226 may coat the entire surfaces of the particles.

In particular, the metal material 226 in the voids 224B also has a function of filling the gaps 225 between the individual layers. To be more specific, when a negative electrode material is deposited by performing deposition several times, fine protrusions occur on the surfaces of the negative electrode active material particles 221 each time the deposition is conducted. Thus, the metal material 226 fills not only the voids 224B between the layers but also the gaps 225 of the individual layers.

Note that FIGS. 5A to 6B illustrate the case in which the negative electrode active material particles 221 have a multilayer structure and both the voids 224A and 224B are present in the negative electrode active material layer 22B. Thus, the negative electrode active material layer 22B have the voids 224A and 224B filled with the metal material 226. In contrast, in the case where the negative electrode active material particles 221 have a single layer structure and only the voids 224A are present in the negative electrode active material layer 22B, the metal material 226 is present only in the voids 224A of the negative electrode active material layer 22B. Naturally, since the gaps 225 occur in both cases, the metal material 226 fills the gaps 225 in both cases.

Separator

The separator 23 isolates the positive electrode 21 and the negative electrode 22 from each other and allows lithium ions to pass through while preventing shorting of the electrical current caused by the contact between the electrodes. The separator 23 is impregnated with the above-mentioned electrolyte which is a liquid electrolyte (electrolytic solution). The separator 23 is formed of a porous film composed of a synthetic resin or a ceramic, for example, or may be a laminate constituted by two or more types of porous films. Examples of the synthetic resin include polytetrafluoroethylene, polypropylene, and polyethylene.

Operation of the Secondary Battery

When the secondary battery is being charged, lithium ions are released from the positive electrode 21 and occluded in the negative electrode 22 via the electrolytic solution impregnating the separator 23, for example. In contrast, when the secondary battery is being discharged, lithium ions are released from the negative electrode 22 and occluded in the positive electrode 21 via the electrolytic solution impregnating the separator 23, for example.

Method for Producing the Secondary Battery

The secondary battery is produced by the following process, for example.

First, the positive electrode 21 is prepared. To begin with, a positive electrode active material is mixed with a positive electrode binder, a positive electrode conductant agent, and the like as needed to prepare a positive electrode mix, and the positive electrode mix is dispersed in an organic solvent to prepare a paste-type positive electrode mix slurry. Then the positive electrode mix slurry is evenly applied on both sides of the positive electrode collector 21A and dried to form the positive electrode active material layers 21B. Lastly, the positive electrode active material layers 21B are press-formed using a roll press machine or the like under heating if necessary. In this case, press-forming may be repeated several times.

Then the negative electrode 22 is prepared by the same process as the positive electrode 21 described above. That is, a negative electrode active material is mixed with a negative electrode binder, a negative electrode conductant agent, and the like as needed to prepare a negative electrode mix, and the negative electrode mix is dispersed in an organic solvent to prepare a paste-type negative electrode mix slurry. Then the negative electrode mix slurry is evenly applied on both sides of the negative electrode collector 22A to form the negative electrode active material layers 22B and the negative electrode active material layers 22B are press-formed.

The negative electrode 22 may be prepared by a process different from that of the positive electrode 21. In such a case, a plurality of negative electrode active material particles are first formed by depositing a negative electrode material on both sides of the negative electrode collector 22A by using a vapor phase method such as a vapor deposition method. Then, if necessary, an oxide-containing film is formed by a liquid phase method such as a liquid phase precipitation method, a metal material is formed by using a liquid phase method such as an electrolytic plating method, or both the oxide-containing film and the metal material are formed to prepare the negative electrode active material layers 22B.

Lastly, the secondary battery is assembled using the positive electrode 21 and the negative electrode 22. First, the positive electrode lead 25 is attached to the positive electrode collector 21A by welding or the like and the negative electrode lead 26 is attached to the negative electrode collector 22A by welding or the like. Then, the positive electrode 21 and the negative electrode 22 are laminated with the separator 23 therebetween and wound to form the wound electrode body 20. The center pin 24 is inserted into the center of the winding. Subsequently, the wound electrode body 20 is housed inside the battery can 11 while being sandwiched between the pair of isolators 12 and 13. In this case, a tip of the positive electrode lead 25 is attached to the safety valve mechanism 15 by welding or the like and a tip of the negative electrode lead 26 is attached to the battery can 11 by welding or the like. Then the electrolytic solution is poured into the battery can 11 to impregnate the separator 23. Lastly, the battery lid 14, the safety valve mechanism 15, and the thermosensitive resistor 16 are caulked at the open end of the battery can 11 through the gasket 17. Thus, the secondary battery shown in FIGS. 1 to 6B is made.

With the first secondary battery, since the electrolyte (electrolytic solution) described above is incorporated, decomposition reaction of the electrolytic solution during charge/discharge operation can be suppressed in the case where the capacity of the negative electrode 22 is indicated by the occlusion and release of lithium ions. As a result, the cycle characteristics and the storage characteristics improve.

In particular, the cycle characteristics and the storage characteristics improve when a metal-based material advantageous for achieving higher capacities is used as the negative electrode active material of the negative electrode 22. Thus higher effects can be obtained when compared to the cases where carbon materials and the like are used.

Other effects exhibited by the first secondary battery are the same as those associated with the electrolyte.

2-2. Second Secondary Battery

A second secondary battery is a lithium metal secondary battery in which the capacity of the negative electrode is indicated by precipitation and dissolution of lithium metal. This secondary battery has the same structure as the first secondary battery except that the negative electrode active material layer 22B is composed of lithium metal, and is produced by the same process as the first secondary battery.

The secondary battery uses lithium metal as the negative electrode active material so that a higher energy density can be obtained. The negative electrode active material layers 22B may be present from the time of assembly or may be absent at the time of assembly so that they can be formed by lithium metal deposited during charging operation. The negative electrode active material layer 22B may be used as a collector so that the negative electrode collector 22A can be omitted.

When the secondary battery is being charged, for example, lithium ions are released from the positive electrode 21 and precipitate into lithium ions at the surface of the negative electrode collector 22A through the electrolytic solution impregnating the separator 23. In contrast, when the secondary battery is being discharged, lithium metal elutes from the negative electrode active material layers 22B by forming lithium ions and occluded in the positive electrode 21 via the electrolytic solution impregnating the separator 23.

In this second secondary battery, the capacity of the negative electrode 22 is indicated by the precipitation and dissolution of the lithium metal and the secondary battery includes the electrolyte (electrolytic solution) mentioned above. Thus, owing to the effects similar to those of the first secondary battery, the cycle characteristics and the storage characteristics can be improved. Other advantages of the secondary battery are the same as those of the first secondary battery.

2-3. Third Secondary Battery

Figure 7:
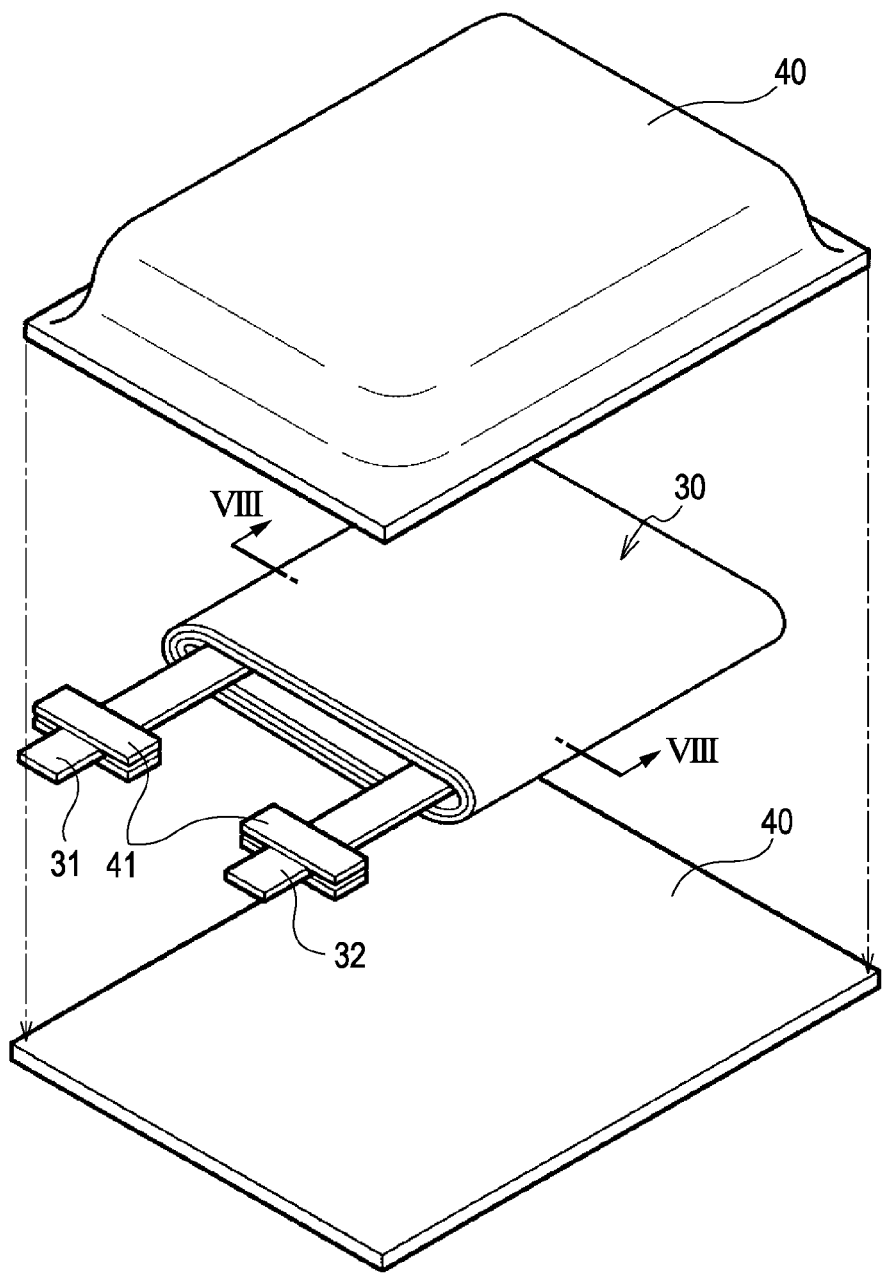
FIG. 7 is an exploded perspective view of a third secondary battery including an electrolyte according to an embodiment.
Figure 8:
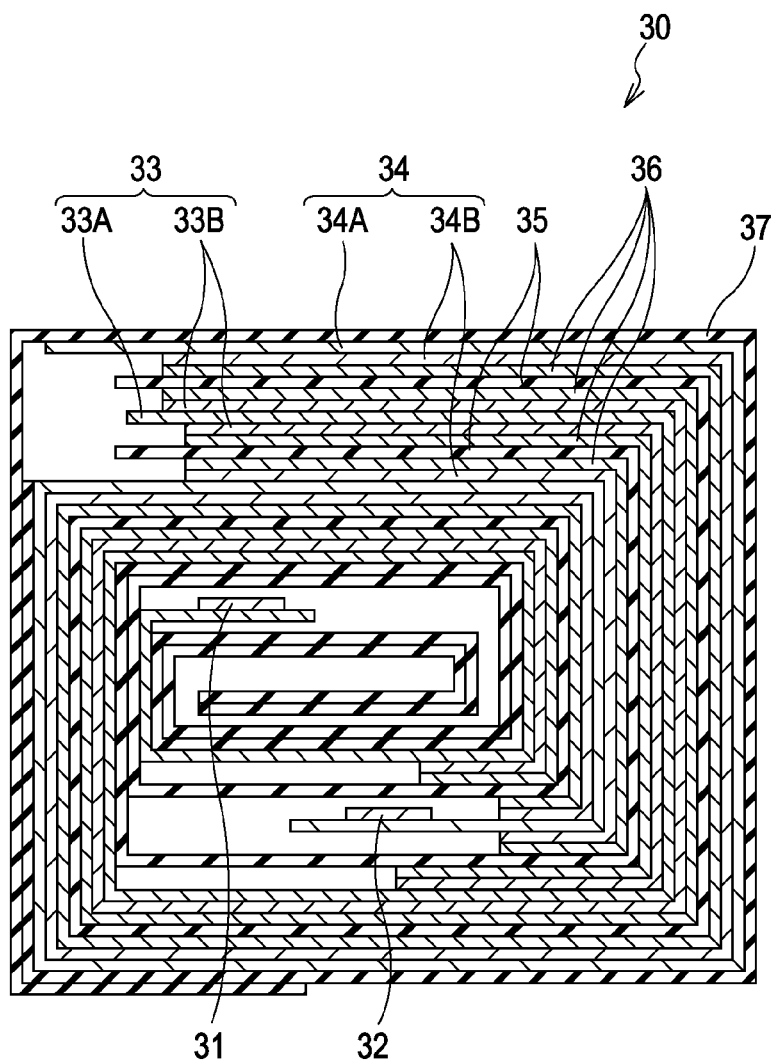
FIG. 8 is a cross-sectional view of a wound electrode body shown in FIG. 7 taken along line VIII-VIII.

FIG. 7 is an exploded perspective view of a third secondary battery. FIG. 8 is an enlarged view of a cross-section of a wound electrode body 30 shown in FIG. 7 taken along line VIII-VIII.

As with the first secondary battery, this secondary battery is a lithium ion secondary battery. Mainly, the wound electrode body 30 to which a positive electrode lead 31 and a negative electrode lead 32 are attached is housed in a film package member 40. A battery structure that uses such a film package member 40 is called a laminate film type.

The positive electrode lead 31 and the negative electrode lead 32 extend in the same direction from the interior of the film package member 40 toward the exterior, for example. However, the positions where the positive electrode lead 31 and the negative electrode lead 32 are provided relative to the wound electrode body 30 and the direction in which the positive electrode lead 31 and the negative electrode lead 32 extend are not particularly limited. The positive electrode lead 31 is composed of, for example, aluminum or the like, and the negative electrode lead 32 is composed of, for example, copper, nickel, stainless steel, or the like. These materials are, for example, thin-plate-shaped or mesh-shaped.

The film package member 40 is, for example, a laminate film including a fusion bonding layer, a metal layer, and a surface-protecting layer stacked in this order. In this case, outer peripheral portions of fusion bonding layers of two films are bonded to each other by fusion-bonding or with an adhesive while arranging the fusion bonding layers to face the wound electrode body 30. The fusion bonding layer is, for example, a film composed of polyethylene, polypropylene, or the like. The metal layer is, for example, an aluminum foil or the like. The surface-protecting layer may be, for example a film composed of nylon, polyethylene terephthalate, or the like.

In particular, the film package member 40 is preferably an aluminum laminate film including a polyethylene film, an aluminum foil, and a nylon film stacked in that order. The film package member 40 may be a laminate film having another laminate structure, a polymer film such as polypropylene, or a metal film instead of the aluminum laminate film.

Contact films 41 for preventing entry of outside air are inserted between the film package member 40 and the positive electrode lead 31 and between the film package member 40 and the negative electrode lead 32. The contact films 41 are composed of a material having adhesiveness to the positive electrode lead 31 and the negative electrode lead 32. Examples of such a material include polyolefin resins such as polyethylene, polypropylene, modified polyethylene, and modified polypropylene.

The wound electrode body 30 includes a positive electrode 33 and a negative electrode 34 laminated with a separator 35 and an electrolyte layer 36 therebetween and its outermost periphery is protected with a protection tape 37. The positive electrode 33 includes, for example, a positive electrode collector 33A and positive electrode active material layers 33B formed on both sides of the positive electrode collector 33A. The structures of the positive electrode collector 33A and the positive electrode active material layers 33B are the same as those of the positive electrode collector 21A and the positive electrode active material layers 21B of the first secondary battery, respectively. The negative electrode 34 includes, for example, a negative electrode collector 34A and negative electrode active material layers 34B formed on both sides of the negative electrode collector 34A. The structures of the negative electrode collector 34A and the negative electrode active material layers 34B are the same as those of the negative electrode collector 22A and the negative electrode active material layers 22B of the first secondary battery, respectively.

The structure of the separator 35 is the same as that of the separator 23 of the first secondary battery.

An electrolyte layer 36 is constituted by an electrolytic solution supported on a polymer compound and may contain other materials such as various additives if necessary. The electrolyte layer 36 is a gel-type electrolyte. A gel-type electrolyte is preferred since a high ion conductivity (e.g., 1 mS/cm or more at room temperature) can be obtained and the leakage of the electrolytic solution can be prevented.

The polymer compound may be at least one selected from the following polymer materials: polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, and a copolymer of vinylidene fluoride and hexafluoropyrene. These may be used alone or in combination. Among these, polyvinylidene fluoride or a copolymer of vinylidene fluoride and hexafluoropyrene are preferred. This is because they are electrochemically stable.

The composition of the electrolytic solution is the same as the composition of the electrolytic solution of the first secondary battery. Note that for the electrolyte layer 36 which is a gel-type electrolyte, the "solvent" of the electrolytic solution represents a wide concept including not only a liquid solvent but also those solvents which have ion conductivity that can achieve dissociation of the electrolyte salt. Thus, when a polymer compound having ion conductivity is used, that polymer compound is included in the solvent.

Alternatively, the electrolytic solution can be directly used instead of the electrolyte layer 36 of a gel type in which the electrolytic solution is supported on the polymer compound. In this case, the separator 35 is impregnated with the electrolytic solution.

When the secondary battery is being charged, lithium ions are released from the positive electrode 33 and occluded in the negative electrode 34 through the electrolyte layer 36, for example. When the secondary battery is being discharged, lithium ions are released from the negative electrode 34 and occluded in the positive electrode 33 through the electrolyte layer 36, for example.

The secondary battery including the gel-type electrolyte layer 36 is produced by any of three production methods described below, for example.

According to a first production method, the positive electrode 33 and the negative electrode 34 are first made by the same process for making the positive electrode 21 and the negative electrode 22 of the first secondary battery. To be more specific, the positive electrode active material layers 33B are formed on both sides of the positive electrode collector 33A to produce the positive electrode 33 and the negative electrode active material layers 34B are formed on both sides of the negative electrode collector 34A to form the negative electrode 34. Then a precursor solution containing the electrolytic solution, the polymer compound, and the solvent is prepared and applied on the positive electrode 33 and the negative electrode 34. The solvent is evaporated to form the gel-type electrolyte layers 36. Then the positive electrode lead 31 is attached to the positive electrode collector 33A by welding or the like and the negative electrode lead 32 is attached to the negative electrode collector 34A by welding or the like. Then the positive electrode 33 and the negative electrode 34 both provided with the electrolyte layers 36 are laminated with the separator 35 therebetween and wound. The protection tape 37 is attached on the outermost periphery to prepare the wound electrode body 30. Lastly, the wound electrode body 30 is placed between the two film package members 40 and the outer peripheral portions of the film package members 40 are bonded by fusion bonding or the like to enclose the wound electrode body 30. During this process, the contact films 41 are inserted between the film package member 40 and the positive electrode lead 31 and between the film package member 40 and the negative electrode lead 32. Thus, the secondary battery shown in FIGS. 7 and 8 is made.

According to a second production method, first, the positive electrode lead 31 is attached to the positive electrode 33 and the negative electrode lead 32 is attached to the negative electrode 34. Then the positive electrode 33 and the negative electrode 34 are laminated with the separator 35 therebetween and wound. The protection tape 37 is bonded on the outermost periphery to form a wound body which is a precursor of the wound electrode body 30. Then the wound body is placed between the two film package members 40 and the outer peripheral portions are bonded to each other except for the outer puerperal portions along one side so as to place the wound body in the bag-shaped film package member 40. Then an electrolyte composition containing the electrolytic solution, a monomer to be used as a material for the polymer compound, a polymerization initiator, and if necessary, other materials such as a polymerization inhibitor is prepared and poured into the bag-shaped film package member 40. The open end of the film package member 40 is then sealed by fusion bonding or the like. Lastly, the monomer is thermally polymerized into a polymer compound to form the gel-type electrolyte layer 36. Thus, the secondary battery is made.

According to a third production method, first, the wound body is prepared and placed in the bag-shaped film package member 40 as in the second production method above except that a separator 35 both sides of which are coated with a polymer compound is used. The polymer compound coating the separator 35 is, for example, a polymer (homopolymer, copolymer, or multi-component copolymer) containing vinylidene fluoride. Specific examples thereof include polyvinylidene fluoride, a binary copolymer containing vinylidene fluoride and hexafluoropropylene, and a tertiary copolymer containing vinylidene fluoride, and hexafluoropropylene, chlorotrifluoroethylene. The polymer compound may contain one or more other polymer compounds in addition to the polymer containing vinylidene fluoride. Then an electrolytic solution is prepared and poured into the film package member 40. The open end of the film package member 40 is sealed by fusion bonding or the like. Lastly, the film package member 40 is heated under load to allow the separator 35 to adhere to the positive electrode 33 and the negative electrode 34 through the polymer compound. As a result, the electrolytic solution impregnates the polymer compound and the polymer compound gels to form the electrolyte layer 36, thereby ending fabrication of the secondary battery.

According to the third production example, swelling of the battery is suppressed compared to the first production method. Moreover, according to the third production method, the monomer, which is a material for the polymer compound, the solvent, or the like rarely remains in the electrolyte layer 36 and the process of forming the polymer compound is controlled well compared to the second production method. Thus, sufficient adhesion is achieved between the positive electrode 33, the negative electrode 34, the separator 35, and the electrolyte layer 36.

In this third secondary battery, the capacity of the negative electrode 34 is indicated by the occlusion and release of lithium ions and the electrolyte layer 36 includes the electrolyte (electrolytic solution) mentioned above. Thus, owing to the effects similar to those of the first secondary battery, the cycle characteristics and the storage characteristics can be improved. Other advantages of the secondary battery are the same as those of the first secondary battery. The third secondary battery does not have to have the same structure as the first secondary battery and may have the same structure as the second secondary battery.

EXAMPLES

Examples of the present application will now be described in detail.

Experimental Examples 1-1 to 1-22

A cylindrical lithium ion secondary battery shown in FIGS. 1 and 2 was prepared by the following process.

First, the positive electrode 21 was made. First, lithium carbonate ($Li_2CO_3$) and cobalt carbonate ($CoCO_3$) were mixed at a molar ratio of 0.5:1 and baked in air at 900° C. for 5 hours to obtain a lithium-cobalt complex oxide ($LiCoO_2$). Then 91 parts by mass of $LiCoO_2$ serving as a positive electrode active material, 6 parts by mass of graphite serving as a positive electrode conductant agent, and 3 parts by mass of polyvinylidene fluoride serving as a positive electrode binder were mixed to prepare a positive electrode mix. The positive electrode mix was dispersed into N-methyl-2-pyrrolidone to prepare a paste-type positive electrode mix slurry. Then the positive electrode mix slurry was evenly applied on both sides of the positive electrode collector 21A by using a coating device and dried to form the positive electrode active material layers 21B. A band-shaped aluminum foil (thickness=20 μm) was used as the positive electrode collector 21A. Lastly, the positive electrode active material layers 21B were press-formed using a roll press machine.

Next, the negative electrode 22 was made. First, 90 parts by mass of synthetic graphite serving as a negative electrode active material and 10 parts by mass of polyvinylidene fluoride serving as a negative electrode binder were mixed to prepare a negative electrode mix. Then the negative electrode mix was dispersed into N-methyl-2-pyrrolidone to prepare a paste-type negative electrode mix slurry. Then the negative electrode mix slurry was evenly applied on both sides of the negative electrode collector 22A by using a coating device and dried to form the negative electrode active material layers 22B. A band-shaped electrolytic copper foil (thickness=15 μm) was used as the negative electrode collector 22A. Lastly, the negative electrode active material layers 22B were press-formed using a roll press machine.

Next, an electrolytic solution, i.e., a liquid electrolyte, was prepared. First, ethylene carbonate (EC), dimethyl carbonate (DMC), an ester compound or the like, an anhydrous compound, and if needed, a phosphoric acid compound were mixed to prepare a solvent. The EC and DMC contents were adjusted to a weight ratio (EC:DMC) of 30:70. The type and the contents of the ester compound or the like and the anhydrous compound in the solvent and presence or absence of the phosphoric acid compound are shown in Table 1. When the phosphoric acid compound was used, the content thereof in the solvent was set to 0.01 wt %. Then lithium hexafluorophosphate (LiPF6) serving as an electrolyte salt was dissolved in the solvent. The electrolyte salt content was 1 mol/kg relative to the solvent.

Lastly, a secondary battery was assembled using the positive electrode 21, the negative electrode 22, and the electrolytic solution. First, the positive electrode lead 25 was welded to the positive electrode collector 21A and the negative electrode lead 26 was welded to the negative electrode collector 22A. Then, the positive electrode 21 and the negative electrode 22 were laminated with the separator 23 therebetween and wound to form the wound electrode body 20. The center pin 24 was inserted into the center of the winding. A microporous polypropylene film (thickness=25 μm) was used as the separator 23. Subsequently, the wound electrode body 20 was housed inside the battery can 11 composed of nickel-plated iron while being sandwiched between the pair of isolators 12 and 13. During this operation, the safety valve mechanism 15 was welded to the positive electrode lead 25 and the negative electrode lead 26 was welded to the battery can 11. Then the electrolytic solution was poured into the battery can 11 by a pressure reduction technique to impregnate the separator 23. Lastly, the battery lid 14, the safety valve mechanism 15, and the thermosensitive resistor 16 were fixed at the open end portion of the battery can 11 by caulking through the gasket 17. Thus, the cylindrical secondary battery was made. In making this secondary battery, the thickness of the positive electrode active material layers 21B was adjusted so that lithium metal does not precipitate on the negative electrode 22 at the time of full charge.

Experimental Examples 1-23 to 1-31

As shown in Table 2, the same process as Experimental Examples 1-1 to 1-20 was conducted except that the ester compound or the like and the anhydrous compound were not used in combination.

The cycle characteristics and the storage characteristics of the secondary batteries of Experimental Examples 1-1 to 1-31 were studied. The obtained results are shown in Tables 1 and 2.

In studying the cycle characteristics, two cycles of charge/discharge operation were conducted in a 23° C. atmosphere and then the discharge capacity of the second cycle was measured. Next, charge/discharge operation was repeated in the same atmosphere until the total number of cycles reached 100, and the discharge capacity of the 100th cycle was measured. Lastly, the cycle discharge capacity retention rate (%)=(discharge capacity of 100th cycle/discharge capacity of the 2nd cycle)×100 was calculated. During the charging operation, constant-current constant-voltage charging was conducted at a 0.2 C current up to the upper limit voltage of 4.2 V. During the discharging operation, constant-current constant-voltage discharge was conducted at a 0.2 C current down to a final voltage of 2.5 V. Here, "0.2 C" refers to the current value according to which a theoretical capacity is completely discharged in 5 hours.

In studying the storage characteristics, two cycles of charge/discharge operation were conducted in a 23° C. atmosphere and then the discharge capacity before storage was measured. Then, the battery was charged again, stored in a thermostat vessel at 80° C. for 10 days, and discharged in a 23° C. atmosphere to measure the discharge capacity after storage. Lastly, the storage discharge capacity retention rate (%)=(discharge capacity after storage/discharge capacity before storage)×100 was calculated. The conditions for charge/discharge operation were the same as those used to study the cycle characteristics.

Note that the same process and conditions for studying the cycle characteristics and the storage characteristics are used in the following examples also.

TABLE 1

Negative electrode active material: synthetic graphite,
Solvent: EC + DMC, Electrolyte salt: $LiPF_6$

| Table 1 | Other solvents | | | | | | Cycle discharge capacity retention rate (%) | Storage discharge capacity retention rate (%) |
|---|---|---|---|---|---|---|---|---|
| | Ester compound or the like | | Anhydrous compound | | Phosphoric acid compound | | | |
| | Type | Content (wt %) | Type | Content (wt %) | Type | Content (wt %) | | |
| Exp. Ex. 1-1 | Formula (1-1) | 0.001 | Formula (4-2) | 1 | — | — | 82 | 88 |
| Exp. Ex. 1-2 | | 0.1 | | | | | 84 | 89 |
| Exp. Ex. 1-3 | | 0.2 | | | | | 85 | 90 |
| Exp. Ex. 1-4 | | 1 | | | | | 86 | 90 |
| Exp. Ex. 1-5 | | 5 | | | | | 80 | 89 |
| Exp. Ex. 1-6 | | 10 | | | | | 79 | 87 |
| Exp. Ex. 1-7 | Formula (2-1) | 0.2 | | | | | 84 | 89 |
| Exp. Ex. 1-8 | Formula (3-1) | | | | | | 86 | 91 |
| Exp. Ex. 1-9 | $Li_2PFO_3$ | | | | | | 84 | 88 |
| Exp. Ex. 1-10 | $LiPF_2O_2$ | | | | | | 85 | 90 |
| Exp. Ex. 1-11 | Formula (1-1) | 0.2 | Formula (4-1) | 1 | — | — | 84 | 89 |
| Exp. Ex. 1-12 | Formula (2-1) | | | | | | 83 | 88 |
| Exp. Ex. 1-13 | Formula (3-1) | | | | | | 86 | 90 |
| Exp. Ex. 1-14 | $Li_2PFO_3$ | | | | | | 83 | 88 |
| Exp. Ex. 1-15 | $LiPF_2O_2$ | | | | | | 85 | 90 |
| Exp. Ex. 1-16 | Formula (1-1) | 0.2 | Formula (5-1) | 1 | — | — | 85 | 90 |
| Exp. Ex. 1-17 | Formula (2-1) | | | | | | 84 | 89 |
| Exp. Ex. 1-18 | Formula (3-1) | | | | | | 86 | 90 |
| Exp. Ex. 1-19 | $Li_2PFO_3$ | | | | | | 85 | 88 |
| Exp. Ex. 1-20 | $LiPF_2O_2$ | | | | | | 85 | 90 |
| Exp. Ex. 1-21 | Formula (1-1) + Formula (3-1) | 0.2 + 0.2 | Formula (4-2) | 1 | — | — | 86 | 92 |
| Exp. Ex. 1-22 | Formula (1-1) | 0.2 | Formula (4-2) | 1 | Formula (6-1) | 0.01 | 85 | 92 |

Exp. Ex.: Experimental Example

TABLE 2

Negative electrode active material: synthetic graphite,
Solvent: EC + DMC, Electrolyte salt: $LiPF_6$

| Table 2 | Other solvents | | | | Cycle discharge capacity retention rate (%) | Storage discharge capacity retention rate (%) |
|---|---|---|---|---|---|---|
| | Ester compound | | Anhydrous compound | | | |
| | Type | Content (wt %) | Type | Content (wt %) | | |
| Exp. Ex. 1-23 | — | — | — | — | 75 | 81 |
| Exp. Ex. 1-24 | Formula (1-1) | 0.2 | — | — | 77 | 82 |
| Exp. Ex. 1-25 | Formula (2-1) | | | | 76 | 82 |
| Exp. Ex. 1-26 | Formula (3-1) | | | | 78 | 83 |

TABLE 2-continued

Negative electrode active material: synthetic graphite,
Solvent: EC + DMC, Electrolyte salt: LiPF$_6$

| Table 2 | Other solvents | | | | Cycle discharge capacity retention rate (%) | Storage discharge capacity retention rate (%) |
|---|---|---|---|---|---|---|
| | Ester compound | | Anhydrous compound | | | |
| | Type | Content (wt %) | Type | Content (wt %) | | |
| Exp. Ex. 1-27 | Li$_2$PFO$_3$ | | | | 75 | 82 |
| Exp. Ex. 1-28 | LiPF$_2$O$_2$ | | | | 77 | 82 |
| Exp. Ex. 1-29 | — | — | Formula (4-2) | 1 | 79 | 85 |
| Exp. Ex. 1-30 | | | Formula (4-1) | | 78 | 84 |
| Exp. Ex. 1-31 | | | Formula (5-1) | | 78 | 84 |

Exp. Ex.: Experimental Example

According to the secondary battery that contained synthetic graphite as the negative electrode active material, the cycle discharge capacity retention rate and the storage discharge capacity retention rate were higher when the ester compound or the like and the anhydrous compound were used in combination than when they were not used in combination. In particular, when the ester compound or the like and the anhydrous compound were used, better results were obtained at an ester compound content of 10 wt % or less and an anhydrous compound content of 1 wt % or less. Better results were also obtained when the phosphoric acid compound was used with the ester compound or the like and the anhydrous compound. These results indicate that for the secondary battery, the cycle characteristics and the storage characteristics improve when synthetic graphite is used as the negative electrode active material and the solvent of the electrolyte contains the ester compound or the like and the anhydrous compound.

The significance of using the ester compound or the like and the anhydrous compound in combination will now be explained. The following can be derived from the results shown in Tables 1 and 2. When only the ester compound or the like is used, both the cycle discharge capacity retention rate and the storage discharge capacity retention rate increase slightly compared to when none of the ester compound or the like and the anhydrous compound is used. When only the anhydrous compound is used, both the cycle discharge capacity retention rate and the storage discharge capacity retention rate also increase slightly compared to when none of the ester compound or the like and the anhydrous compound is used. Based on these results, the combined used of the ester compound or the like and the anhydrous compound is supposed to give a result which is merely a sum of the results obtained when they are used separately. In other words, the increase in the cycle discharge capacity retention rate and the storage discharge capacity retention rate is supposed to be equal to the total of the increases achieved when the ester compound or the like and the anhydrous compound are used separately. However, actually, the increase is far higher when the ester compound or the like and the anhydrous compound are used in combination than the total of the increases obtained when they are used separately. These results show that when the ester compound or the like and the anhydrous compound are used in combination, synergetic effects cause the cycle discharge capacity retention rate and the storage discharge capacity retention rate to significantly increase, which is a special advantage. Thus, the significance of using the ester compound or the like and the anhydrous compound in combination is that an advantage not predictable from the results obtained by separately using the ester compound of the like and the anhydrous compound can be obtained.

Experimental Examples 2-1 to 2-12

As shown in Table 3, the same process as Experimental Examples 1-3 and 1-23 was conducted except that the composition of the solvent was changed. In these examples, vinylene carbonate (VC), bis(fluoromethyl) carbonate (DFDMC), and 4-fluoro-1,3-dioxolan-2-one (FEC) were used. Moreover, trans-4,5-difluoro-1,3-dioxolan-2-one (TDFEC) and cis-4,5-difluoro-1,3-dioxolan-2-one (CDFEC) were used. Propene sultone (PRS), succinic anhydride (SA), and sulfobenzoic anhydride (SBAH) were also used. The VC content, the PRS content, the SA content, and the SBAH content in the solvent were 1 wt % each and the DFDMC content, the FEC content, the TDFEC content, and the CDFEC content in the solvent were 5 wt % each. The cycle characteristics and the storage characteristics of the secondary batteries of Experimental Examples 2-1 to 2-12 were studied. The obtained results are shown in Table 3.

TABLE 3

Negative electrode active material: synthetic graphite,
Solvent: EC + DMC, Electrolyte salt: LiPF$_6$

| Table 3 | Solvent | Other solvents | | | | Cycle discharge capacity retention rate (%) | Storage discharge capacity retention rate (%) |
|---|---|---|---|---|---|---|---|
| | | Ester compound | | Anhydrous compound | | | |
| | | Type | Content (wt %) | Type | Content (wt %) | | |
| Exp. Ex. 2-1 | VC | Formula (1-1) | 0.2 | Formula (4-2) | 1 | 89 | 91 |
| Exp. Ex. 2-2 | DFDMC | | | | | 89 | 88 |

TABLE 3-continued

Negative electrode active material: synthetic graphite,
Solvent: EC + DMC, Electrolyte salt: LiPF$_6$

| Table 3 | Solvent | Other solvents | | | | Cycle discharge capacity retention rate (%) | Storage discharge capacity retention rate (%) |
|---|---|---|---|---|---|---|---|
| | | Ester compound | | Anhydrous compound | | | |
| | | Type | Content (wt %) | Type | Content (wt %) | | |
| Exp. Ex. 2-3 | FEC | | | | | 90 | 92 |
| Exp. Ex. 2-4 | TDFEC | | | | | 91 | 91 |
| Exp. Ex. 2-5 | CDFEC | | | | | 91 | 91 |
| Exp. Ex. 2-6 | VC + FEC | | | | | 92 | 94 |
| Exp. Ex. 2-7 | FEC + PRS | | | | | 92 | 94 |
| Exp. Ex. 2-8 | FEC + SA | | | | | 93 | 93 |
| Exp. Ex. 2-9 | FEC + SBAH | | | | | 93 | 94 |
| Exp. Ex. 2-10 | VC | — | — | — | — | 78 | 83 |
| Exp. Ex. 2-11 | FEC | | | | | 80 | 84 |
| Exp. Ex. 2-12 | TDFEC | | | | | 82 | 84 |

Exp. Ex.: Experimental Example

The results similar to those shown in Tables 1 and 2 were obtained even by changing the composition of the solvent. Better results were obtained when VC and the like were used as the solvent than when they were not used. The results indicate that the cycle characteristics and the storage characteristics of the secondary battery containing synthetic graphite as a negative electrode active material improve even when the composition of the electrolytic solution is changed.

Experimental Examples 3-1 to 3-4

As shown in Table 4, the same process as Experimental Examples 1-3 and 1-23 was conducted except that the type of the electrolyte salt was changed. In these examples, lithium tetrafluoroborate (LiBF$_4$), a compound represented by formula (12-6), and a lithium bis(trifluoromethanesulfonyl) imide (LiN(CF$_3$SO$_2$)$_2$) (LiTFSI) were used as the electrolyte salt. The LiPF$_6$ content was set to 0.9 mol/kg with respect to the solvent and the content of LiBF$_4$ or the like was set to 0.1 mol/kg with respect to the solvent. The cycle characteristics and the storage characteristics of the secondary batteries of Experimental Examples 3-1 to 3-4 were studied. The obtained results are shown in Table 4.

Better results were obtained when LiBF$_4$ or the like was used as the electrolyte salt than when not. The results indicate that the cycle characteristics and the storage characteristics of the secondary battery containing synthetic graphite as a negative electrode active material improve even when the type of the electrolyte salt is changed.

Experimental Examples 4-1 to 4-31

The same process as Experimental Examples 1-1 to 1-31 was conducted except that the negative electrode 22 was made by using silicon as the negative electrode active material and diethyl carbonate (DEC) was used as the solvent instead of DMC. In making the negative electrode 22, silicon was deposited on the surfaces of the negative electrode collector 22A by a vapor deposition method (electron beam deposition method) to form the negative electrode active material layers 22B containing negative electrode active material particles. In these examples, the deposition step was repeated 10 times to make a negative electrode active material layer 22B having a total thickness of 6 μm. The cycle characteristics and the storage characteristics of the secondary batteries of Experimental Examples 4-1 to 4-31 were studied. The obtained results are shown in Tables 5 and 6.

TABLE 4

Negative electrode active material: synthetic graphite,
Solvent: EC + DMC, Electrolyte salt: LiPF$_6$

| Table 4 | Other solvents | | | | Electrolyte salt | Cycle discharge capacity retention rate (%) | Storage discharge capacity retention rate (%) |
|---|---|---|---|---|---|---|---|
| | Ester compound | | Anhydrous compound | | | | |
| | Type | Content (wt %) | Type | Content (wt %) | | | |
| Exp. Ex. 3-1 | Formula (1-1) | 0.2 | Formula (4-2) | 1 | LiBF$_4$ | 85 | 92 |
| Exp. Ex. 3-2 | | | | | (12-6) | 86 | 93 |
| Exp. Ex. 3-3 | | | | | LiTFSI | 88 | 92 |
| Exp. Ex. 3-4 | — | — | — | — | Formula (12-6) | 79 | 83 |

Exp. Ex.: Experimental Example

TABLE 5

Negative electrode active material: silicon, Solvent: EC + DEC, Electrolyte salt: $LiPF_6$

| Table 5 | Ester compound or the like Type | Content (wt %) | Anhydrous compound Type | Content (wt %) | Phosphoric acid compound Type | Content (wt %) | Cycle discharge capacity retention rate (%) | Storage discharge capacity retention rate (%) |
|---|---|---|---|---|---|---|---|---|
| Exp. Ex. 4-1 | Formula (1-1) | 0.001 | Formula (4-2) | 1 | — | — | 58 | 88 |
| Exp. Ex. 4-2 |  | 0.1 |  |  |  |  | 61 | 89 |
| Exp. Ex. 4-3 |  | 0.2 |  |  |  |  | 61 | 90 |
| Exp. Ex. 4-4 |  | 1 |  |  |  |  | 60 | 90 |
| Exp. Ex. 4-5 |  | 5 |  |  |  |  | 58 | 89 |
| Exp. Ex. 4-6 |  | 10 |  |  |  |  | 55 | 87 |
| Exp. Ex. 4-7 | Formula (2-1) | 0.2 |  |  |  |  | 59 | 88 |
| Exp. Ex. 4-8 | Formula (3-1) |  |  |  |  |  | 62 | 91 |
| Exp. Ex. 4-9 | $Li_2PFO_3$ |  |  |  |  |  | 60 | 88 |
| Exp. Ex. 4-10 | $LiPF_2O_2$ |  |  |  |  |  | 61 | 89 |
| Exp. Ex. 4-11 | Formula (1-1) | 0.2 | Formula (4-1) | 1 |  |  | 60 | 89 |
| Exp. Ex. 4-12 | Formula (2-1) |  |  |  |  |  | 59 | 89 |
| Exp. Ex. 4-13 | Formula (3-1) |  |  |  |  |  | 62 | 90 |
| Exp. Ex. 4-14 | $Li_2PFO_3$ |  |  |  |  |  | 60 | 88 |
| Exp. Ex. 4-15 | $LiPF_2O_2$ |  |  |  |  |  | 62 | 89 |
| Exp. Ex. 4-16 | Formula (1-1) | 0.2 | Formula (5-1) | 1 | — | — | 62 | 90 |
| Exp. Ex. 4-17 | Formula (2-1) |  |  |  |  |  | 61 | 89 |
| Exp. Ex. 4-18 | Formula (3-1) |  |  |  |  |  | 63 | 92 |
| Exp. Ex. 4-19 | $Li_2PFO_3$ |  |  |  |  |  | 60 | 88 |
| Exp. Ex. 4-20 | $LiPF_2O_2$ |  |  |  |  |  | 62 | 89 |
| Exp. Ex. 4-21 | Formula (1-1) + Formula (3-1) | 0.2 + 0.2 | Formula (4-2) | 1 | — | — | 63 | 92 |
| Exp. Ex. 4-22 | Formula (1-1) | 0.2 | Formula (4-2) | 1 | Formula (6-1) | 0.01 | 62 | 92 |

Exp. Ex.: Experimental Example

TABLE 6

Negative electrode active material: silicon, Solvent: EC + DEC, Electrolyte salt: $LiPF_6$

| Table 6 | Ester compound Type | Content (wt %) | Anhydrous compound Type | Content (wt %) | Cycle discharge capacity retention rate (%) | Storage discharge capacity retention rate (%) |
|---|---|---|---|---|---|---|
| Exp. Ex. 4-23 | — | — | — | — | 40 | 81 |
| Exp. Ex. 4-24 | Formula (1-1) | 0.2 | — | — | 42 | 82 |
| Exp. Ex. 4-25 | Formula (2-1) |  |  |  | 41 | 82 |
| Exp. Ex. 4-26 | Formula (3-1) |  |  |  | 44 | 83 |
| Exp. Ex. 4-27 | $Li_2PFO_3$ |  |  |  | 40 | 82 |
| Exp. Ex. 4-28 | $LiPF_2O_2$ |  |  |  | 42 | 82 |
| Exp. Ex. 4-29 | — | — | Formula (4-2) | 1 | 55 | 85 |
| Exp. Ex. 4-30 |  |  | Formula (4-1) |  | 54 | 84 |
| Exp. Ex. 4-31 |  |  | Formula (5-1) |  | 54 | 84 |

Exp. Ex.: Experimental Example

Results similar to those shown in Tables 1 and 2 were obtained from the secondary batteries that use silicon as the negative electrode active material. That is, the cycle discharge capacity retention rate and the storage discharge capacity retention rate were higher when the ester compound or the like and the anhydrous compound were used in combination than when they were not. These results indicate that for the secondary battery, the cycle characteristics and the storage characteristics improve when silicon is used as the negative electrode active material and the solvent of the electrolyte contains the ester compound or the like and the anhydrous compound.

Experimental Examples 5-1 to 5-12

As shown in Table 7, the same process as Experimental Examples 2-1 to 2-12 was conducted except that silicon was used as the negative electrode active material as with Experimental Examples 4-1 to 4-31. The cycle characteristics and the storage characteristics of the secondary batteries of Experimental Examples 5-1 to 5-12 were studied. The obtained results are shown in Table 7.

TABLE 7

Negative electrode active material: silicon, Solvent: EC + DEC, Electrolyte salt: $LiPF_6$

| | | Other solvents | | | | Cycle | Storage |
| | | Ester compound | | Anhydrous compound | | discharge capacity | discharge capacity |
| Table 7 | Solvent | Type | Content (wt %) | Type | Content (wt %) | retention rate (%) | retention rate (%) |
|---|---|---|---|---|---|---|---|
| Exp. Ex. 5-1 | VC | Formula (1-1) | 0.2 | Formula (4-2) | 1 | 80 | 93 |
| Exp. Ex. 5-2 | DFDMC | | | | | 72 | 92 |
| Exp. Ex. 5-3 | FEC | | | | | 72 | 94 |
| Exp. Ex. 5-4 | TDFEC | | | | | 85 | 94 |
| Exp. Ex. 5-5 | CDFEC | | | | | 85 | 94 |
| Exp. Ex. 5-6 | VC + FEC | | | | | 78 | 94 |
| Exp. Ex. 5-7 | FEC + PRS | | | | | 72 | 95 |
| Exp. Ex. 5-8 | FEC + SA | | | | | 73 | 95 |
| Exp. Ex. 5-9 | FEC + SBAH | | | | | 74 | 95 |
| Exp. Ex. 5-10 | VC | — | — | — | — | 70 | 84 |
| Exp. Ex. 5-11 | FEC | | | | | 60 | 84 |
| Exp. Ex. 5-12 | TDFEC | | | | | 76 | 84 |

Exp. Ex.: Experimental Example

The results similar to those shown in Tables 5 and 6 were obtained even by changing the composition of the solvent. The results indicate that the cycle characteristics and the storage characteristics of the secondary battery containing silicon as a negative electrode active material improve even when the composition of the solvent is changed.

Experimental Examples 6-1 to 6-4

As shown in Table 8, the same process as Experimental Examples 3-1 to 3-4 was conducted except that silicon was used as the negative electrode active material as with Experimental Examples 4-1 to 4-31. The cycle characteristics and the storage characteristics of the secondary batteries of Experimental Examples 6-1 to 6-4 were studied. The obtained results are shown in Table 8.

TABLE 8

Negative electrode active material: silicon, Solvent: EC + DEC, Electrolyte salt: $LiPF_6$

| | Other solvents | | | | | Cycle | Storage |
| | Ester compound | | Anhydrous compound | | | discharge capacity | discharge capacity |
| Table 8 | Type | Content (wt %) | Type | Content (wt %) | Electrolyte salt | retention rate (%) | retention rate (%) |
|---|---|---|---|---|---|---|---|
| Exp. Ex. 6-1 | Formula (1-1) | 0.2 | Formula (4-2) | 1 | $LiBF_4$ | 61 | 91 |
| Exp. Ex. 6-2 | | | | | Formula (12-6) | 62 | 92 |
| Exp. Ex. 6-3 | | | | | LiTFSI | 64 | 90 |
| Exp. Ex. 6-4 | — | — | — | — | Formula (12-6) | 50 | 83 |

Exp. Ex.: Experimental Example

The results similar to those shown in Tables 5 and 6 were obtained even by changing the composition of the electrolyte salt. The results indicate that the cycle characteristics and the storage characteristics of the secondary battery containing silicon as a negative electrode active material improve even when the composition of the electrolyte salt is changed.

Experimental Examples 7-1 to 7-4

The same processes as Experimental Examples 4-2, 5-3, 4-23, and 5-11 were conducted except that the negative electrode 22 was prepared by using a SnCoC-containing material as the negative electrode active material.

The negative electrode 22 was made as follows. First, a cobalt powder and a tin powder were alloyed to form a cobalt/tin alloy powder. A carbon powder was added thereto and the resulting mixture was dry-mixed. Then 10 g of the mixture was placed in a reactor of a planetary ball mill produced by Ito Seisakusho Co., Ltd., along with about 400 g of steel balls having a diameter of 9 mm. After the atmosphere in the reactor was purged with argon, a cycle of 10 minutes of operation at 250 rotations per minute and 10 minutes of rest was repeated until the total time of operation was 20 hours. Then the reactor was cooled to room temperature and the SnCoC-containing material was discharged and filtered through a 280-mesh screen to remove coarse particles.

Figure 9:
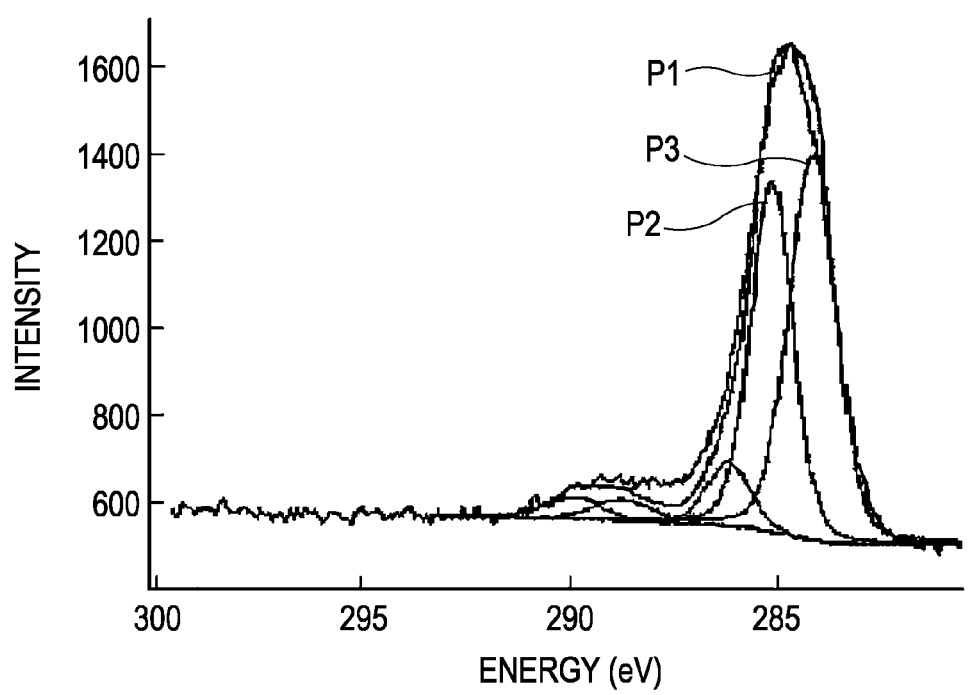
FIG. 9 is a graph showing results of analyzing a SnCoC-containing material by X-ray photoelectron spectroscopy (XPS).

The composition of the obtained SnCoC-containing material was analyzed. It was found that the tin content was 49.5 mass %, the cobalt content was 29.7 mass %, the carbon content was 19.8 mass %, and the ratio of the cobalt to the total of the tin and cobalt (Co/(Sn+Co)) was 37.5 mass %. The tin and cobalt contents were measured by inductively coupled plasma (ICP) spectroscopy and the carbon content was measured with a carbon/sulfur analyzer. The SnCoC-containing material was also analyzed by X-ray diffraction. A diffraction peak having a half-width value of $1.0°$ or more in terms of $2\theta$ diffraction angle was found in the range of diffraction angle $2\theta=20°$ to $50°$. The SnCoC-containing material was further analyzed by XPS and peak P1 was obtained as shown in FIG. 9. When the peak P1 was analyzed, peak P2 of surface-contaminating carbon and peak P3 of C1s in the SnCoC-containing material at the lower-energy-side of the peak P2 (the region lower than 284.5 eV) were obtained. These results confirmed that carbon in the SnCoC-containing material is bonded to other elements.

After the SnCoC-containing material was obtained, 80 parts by mass of the SnCoC-containing material serving as a negative electrode active material was mixed with 8 parts by mass of polyvinylidene fluoride serving as a negative electrode binder and 11 parts by mass of graphite and 1 part by weight of acetylene black serving as negative electrode conductant agents to prepare a negative electrode mix. Then the negative electrode mix was dispersed into N-methyl-2-pyrrolidone to prepare a paste-type negative electrode mix slurry. Lastly, the negative electrode mix slurry was evenly applied on both sides of the negative electrode collector 22A by using a coating device and dried to form the negative electrode active material layers 22B. The negative electrode active material layers 22B were then press-formed with a roll press machine.

The cycle characteristics and the storage characteristics of the secondary batteries of Experimental Examples 7-1 to 7-4 were studied. The obtained results are shown in Table 9.

TABLE 9

Negative electrode active material: SnCoC-containing material, Solvent: EC + DEC, Electrolyte salt: $LiPF_6$

| | | Other solvents | | | | Cycle | Storage |
|---|---|---|---|---|---|---|---|
| | | Ester compound | | Anhydrous compound | | discharge capacity | discharge capacity |
| Table 9 | Solvent | Type | Content (wt %) | Type | Content (wt %) | retention rate (%) | retention rate (%) |
| Exp. Ex. 7-1 | — | Formula (1-1) | 0.1 | Formula (4-2) | 1 | 85 | 82 |
| Exp. Ex. 7-2 | FEC | | | | | 92 | 86 |
| Exp. Ex. 7-3 | — | — | — | — | — | 70 | 76 |
| Exp. Ex. 7-4 | FEC | | | | | 90 | 84 |

Exp. Ex.: Experimental Example

The results similar to those shown in Tables 5 to 7 were obtained from the secondary batteries that use the SnCoC-containing material as the negative electrode active material. That is, the cycle discharge capacity retention rate and the storage discharge capacity retention rate were higher when the ester compound or the like and the anhydrous compound were used in combination than when they were not. These results indicate that for the secondary battery, the cycle characteristics and the storage characteristics improve when the SnCoC-containing material is used as the negative electrode active material and the solvent of the electrolytic solution contains the ester compound or the like and the anhydrous compound.

Experimental Examples 8-1 to 8-6, 9-1, 9-2, 10-1, and 10-2

As shown in Tables 10 to 12, the same processes as Experimental Examples 4-2, 5-3, 5-4, 4-23, 5-11, and 5-12 were conducted except that at least one of an oxide-containing film and a metal material was formed.

In the examples in which the oxide-containing film was formed, negative electrode active material particles were formed first and then silicon oxide ($SiO_2$) was precipitated on the surfaces of the negative electrode active material particles by a liquid phase precipitation method. In these examples, the negative electrode collector 22A on which the negative electrode active material particles were formed was immersed for 3 hours in a solution prepared by dissolving boron serving as an anion scavenger in hydrofluorosilicic acid to allow silicon oxide to precipitate on the surfaces of the negative electrode active material particles and then washed with washer, followed by vacuum drying.

In forming the metal material, a cobalt (Co) plating film was deposited by an electroplating method in voids between the negative electrode active material particles while energizing and supplying air to the plating solution. In this case, a cobalt plating solution produced by Japan Pure Chemical Co., Ltd. was used as the plating solution, the current density was set to 2 A/dm$^2$ to 5 A/dm$^2$, and the plating rate was set to 10 nm/sec.

The cycle characteristics and the storage characteristics of the secondary batteries of Experimental Examples 8-1 to 8-6, 9-1, 9-2, 10-1, and 10-2 were studied. The obtained results are shown in Tables 10 to 12.

TABLE 10

| Table 10 | Solvent | Ester compound Type | Content (wt %) | Anhydrous compound Type | Content (wt %) | Oxide-containing film | Metal material | Cycle discharge capacity retention rate (%) | Storage discharge capacity retention rate (%) |
|---|---|---|---|---|---|---|---|---|---|
| Exp. Ex. 8-1 | — | Formula (1-1) | 0.1 | Formula (4-2) | 1 | SiO$_2$ | Co | 88 | 80 |
| Exp. Ex. 8-2 | FEC | | | | | | | 91 | 88 |
| Exp. Ex. 8-3 | TDFEC | | | | | | | 92 | 92 |
| Exp. Ex. 8-4 | — | — | — | — | — | SiO$_2$ | Co | 86 | 75 |
| Exp. Ex. 8-5 | FEC | | | | | | | 89 | 84 |
| Exp. Ex. 8-6 | TDFEC | | | | | | | 88 | 90 |

Negative electrode active material: silicon, Solvent: EC + DEC, Electrolyte salt: LiPF$_6$ Exp. Ex.: Experimental Example

TABLE 11

| Table 11 | Ester compound Type | Content (wt %) | Anhydrous compound Type | Content (wt %) | Oxide-containing film | Metal material | Cycle discharge capacity retention rate (%) | Storage discharge capacity retention rate (%) |
|---|---|---|---|---|---|---|---|---|
| Exp. Ex. 9-1 | Formula (1-1) | 0.1 | Formula (4-2) | 1 | SiO$_2$ | — | 88 | 78 |
| Exp. Ex. 9-2 | — | — | — | — | SiO$_2$ | — | 86 | 70 |

Negative electrode active material: silicon, Solvent: EC + DEC, Electrolyte salt: LiPF$_6$ Exp. Ex.: Experimental Example

TABLE 12

| Table 12 | Ester compound Type | Content (wt %) | Anhydrous compound Type | Content (wt %) | Oxide-containing film | Metal material | Cycle discharge capacity retention rate (%) | Storage discharge capacity retention rate (%) |
|---|---|---|---|---|---|---|---|---|
| Exp. Ex. 10-1 | Formula (1-1) | 0.1 | Formula (4-2) | 1 | — | Co | 88 | 76 |
| Exp. Ex. 10-2 | — | — | — | — | — | Co | 86 | 65 |

Negative electrode active material: silicon, Solvent: EC + DEC, Electrolyte salt: LiPF$_6$ Exp. Ex.: Experimental Example The results similar to those shown in Tables 5 to 7 were obtained even when the oxide-containing film and the metal material were formed. In particular, better results were obtained when the oxide-containing film and the metal material were formed than when they were not formed. Better results were obtained when both the oxide-containing film and the metal material were formed than when only one of them was formed. When one of the oxide-containing film and the metal material was formed, better results were obtained from samples with the oxide-containing film. These results show that, according to the secondary battery, the cycle characteristics and the storage characteristics improve even when the oxide-containing film and the metal material are formed.

The results shown in Tables 1 to 12 show that, according to the secondary battery, the solvent of the electrolytic solution contains a combination of an ester compound or the like and an anhydrous compound. Thus, the cycle characteristics and the storage characteristics can be improved irrespective of the type of the negative electrode active material, the solvent composition, the electrolyte salt composition, or the absence or presence of the oxide-containing film and the metal material.

In such a case, the rates of increase in the cycle discharge capacity retention rate and the storage discharge capacity retention rate were greater when the metal-based materials (silicon and SnCoC-containing material) were used than when the carbon material (synthetic graphite) was used as the negative electrode active material. This shows that higher effects can be obtained by using the metal-based material than by using the carbon material. These results are obtained presumably because when a metal-base material advantageous for increasing the capacity is used as the negative electrode active material, the electrolytic solution is more easily decomposed than when a carbon material is used and thus the effect of suppressing the decomposition of the electrolytic solution became particularly notable in such cases.

Although the present invention is described above with reference to embodiments and examples, the present invention is not limited to the embodiments and the examples described above and allows various modifications. For example, the usage of the electrolyte is not limited to secondary batteries and the electrolyte may be used in other electrochemical devices. Examples of other usages include capacitors.

In the embodiments and examples described above, lithium ion secondary batteries and lithium metal secondary batteries are described as the types of the secondary batteries. However, the battery type is not limited to these. The secondary battery can be equally applied to a secondary battery in which the capacity of the negative electrode includes the capacity derived from the occlusion and release of lithium ions and the capacity associated with precipitation and dissolution of lithium metal and can be indicated as the sum of these capacities. In such a case, a negative electrode material that can occlude and release lithium ions is used as the negative electrode active material. The chargeable capacity of the negative electrode material is set to be lower than the discharge capacity of the positive electrode.

Although the cases where the battery structure is of a cylindrical type or a laminate film type and the battery element has a wound structure are described in the embodiments and examples described above, the structures are not limited to these. The secondary battery described herein is equally applicable to cases where the battery has a square, coin, or button structure and where the battery element has other structures such as a multilayer structure.

In the embodiments and examples described above, cases where lithium is used as the element of the electrode reactant are described but the present invention is not limited to these cases. The electrode reactant may be, for example, other group 1A elements such as sodium (Na) and potassium (K), group 2A elements such as magnesium and calcium, and other light metals such as aluminum. The advantages of the present invention should be obtained irrespective of the type of the electrode reactant. Thus, the same advantages can be obtained even when the type of the electrode reactant is changed.

In the embodiments and examples above, the contents of the ester compound or the like and the anhydrous compound are described as optimum ranges derived from the results of the examples. However, the description does not deny the possibility that the contents may be outside the above-described ranges. In other words, the optimum ranges described above are merely preferable ranges for obtaining the advantages of the present invention. The contents may be more or less outside the above-described ranges as long as the advantages of the present invention are obtained.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A secondary battery comprising:

a positive electrode;

a negative electrode; and an electrolyte including a solvent and an electrolyte salt, wherein the solvent contains A and B, A is at least one selected from the group consisting of ester compounds represented by formulae (1), ester compounds represented by formulae (2), ester compounds represented by formulae (3), lithium monofluorophosphate ($Li_2PFO_3$), and lithium difluorophosphate ($LiPF_2O_2$), and B is at least one selected from the group consisting of anhydrous compounds represented by formulae (4), and anhydrous compounds represented by formulae (5):

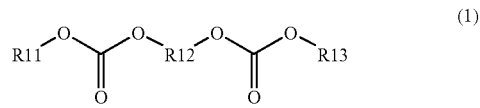

R11 and R13 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R12 represents a linear or branched alkylene group, an arylene group, a divalent group containing an arylene group and an alkylene group, a C2-C12 divalent group containing an ether bond (—O—) and an alkylene group, or a halogenated group thereof;

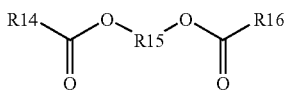 (2)

R14 and R16 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R15 represents a linear or branched alkylene group, an arylene group, a divalent group containing an arylene group and an alkylene group, a C2-C12 divalent group containing an ether bond and an alkylene group, or a halogenated group thereof;

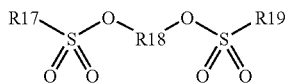 (3)

R17 and R19 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R18 represents a linear or branched alkylene group, an arylene group, a divalent group containing an arylene group and an alkylene group, a C2-C12 divalent group containing an ether bond and an alkylene group, or a halogenated group thereof;

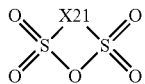 (4)

X21 represents a C2-C4 alkylene group that may be halogenated, a C2-C4 alkenylene group that may be halogenated, an arylene group that may be halogenated, or a derivative thereof; and

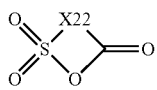 (5)

X22 represents a C2-C4 alkylene group that may be halogenated, a C2-C4 alkenylene group that may be halogenated, an arylene group that may be halogenated, or a derivative thereof.

2. The secondary battery according to claim 1, wherein the ester compounds are represented by formulae (1-1), (2-1), and (3-1):

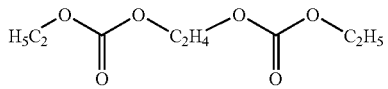 (1-1)

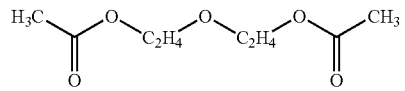 (2-1)

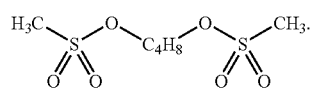 (3-1)

3. The secondary battery according to claim 1, wherein the anhydrous compounds are represented by formulae (4-1) to (4-22) and (5-1) to (5-20):

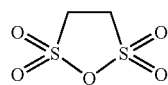 (4-1)

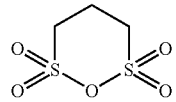 (4-2)

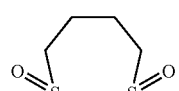 (4-3)

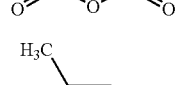 (4-4)

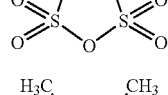 (4-5)

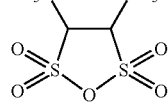 (4-6)

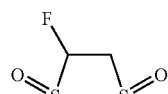 (4-7)

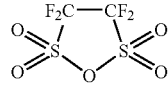 (4-8)

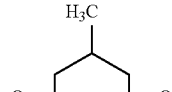 (4-9)

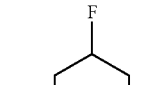 (4-10)

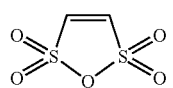 (4-11)
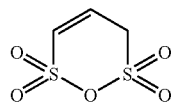 (4-12)
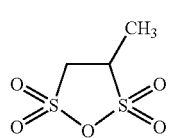 (4-13)
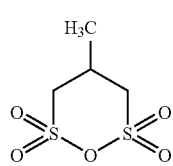 (4-14)
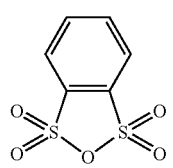 (4-15)
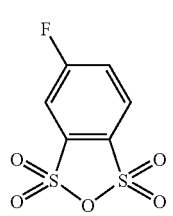 (4-16)
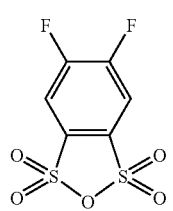 (4-17)
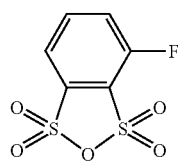 (4-18)
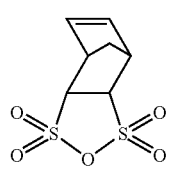 (4-19)
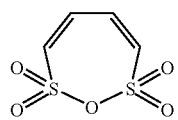 (4-20)
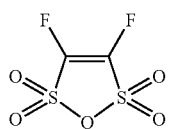 (4-21)
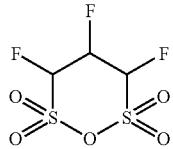 (4-22)
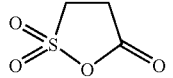 (5-1)
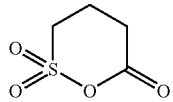 (5-2)
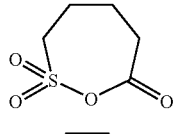 (5-3)
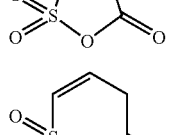 (5-4)
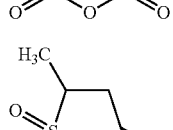 (5-5)
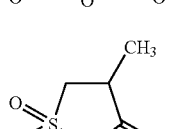 (5-6)
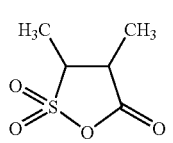 (5-7)
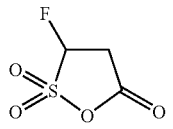 (5-8)
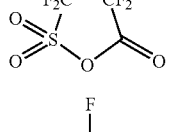 (5-9)
(5-10)
(5-11)

-continued (5-12) 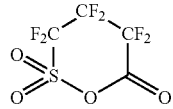

(5-13) 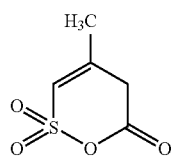

(5-14) 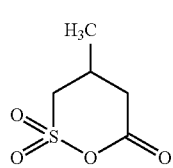

(5-15) 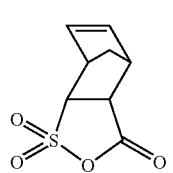

(5-16) 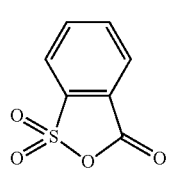

(5-17) 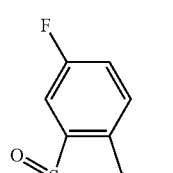

(5-18) 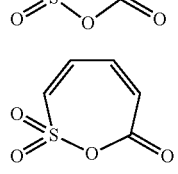

(5-19) 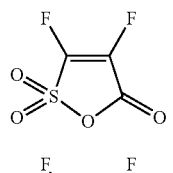

(5-20) 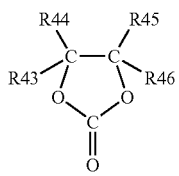

4. The secondary battery according to claim 3, wherein the anhydrous compounds are represented by formulae (4-1), (4-2), and (5-1).

5. The secondary battery according to claim 1, wherein the content of at least one selected from the ester compounds, lithium monofluorophosphate, and lithium difluorophosphate in the solvent is 0.001 wt % or more and 10 wt % or less.

6. The secondary battery according to claim 1, wherein the content of the anhydrous compound in the solvent is 0.01 wt % or more and 1 wt % or less.

7. The secondary battery according to claim 1, wherein the solvent further contains a phosphoric acid compound represented by formula (6):

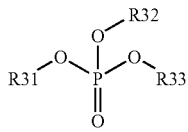
(6)

R31 to R33 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof.

8. The secondary battery according to claim 7, wherein the phosphoric acid compound is represented by formula (6-1):

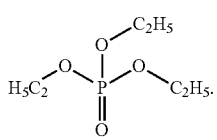
(6-1)

9. The secondary battery according to claim 1, wherein the solvent further contains at least one selected from unsaturated carbon bond-containing cyclic carbonic acid esters represented by formulae (7) to (9), halogenated chain carbonic acid esters represented by formula (10), halogenated cyclic carbonic acid esters represented by formula (11), sultones, and acid anhydrides:

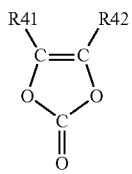
(7)

R41 and R42 each represent a hydrogen group or an alkyl group;

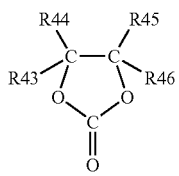
(8)

R43 to R46 each represent a hydrogen group, an alkyl group, a vinyl group, or an allyl group and at least one of R43 to R46 is a vinyl group or an allyl group;

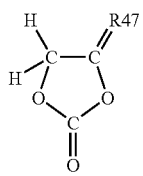
(9)

R47 represents an alkylene group;

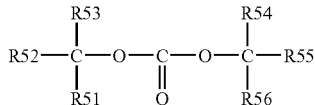
(10)

R51 to R56 each represent a hydrogen group, a halogen group, an alkyl group, or a halogenated alkyl group and at least one of R51 to R56 is a halogen group or a halogenated alkyl group; and

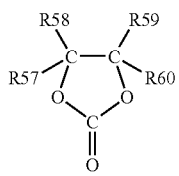
(11)

R57 to R60 each represent a hydrogen group, a halogen group, an alkyl group, or a halogenated alkyl group and at least one of R57 to R60 is a halogen group or a halogenated alkyl group.

10. The secondary battery according to claim 9, wherein the unsaturated carbon bond-containing cyclic carbonic acid esters are vinylene carbonate, vinyl ethylene carbonate, and methylene ethylene carbonate, the halogenated chain carbonic acid esters are fluoromethyl methyl carbonate and bis(fluoromethyl) carbonate, and the halogenated cyclic carbonic acid esters are 4-fluoro-1,3-dioxolan-2-one and 4,5-difluoro-1,3-dioxolan-2-one.

11. The secondary battery according to claim 1, wherein the electrolyte salt includes at least one selected from lithium hexafluorophosphate ($LiPF_6$), lithium tetrafluoroborate ($LiBF_4$), lithium perchlorate ($LiClO_4$), lithium hexafluoroarsenate ($LiAsF_6$), and compounds represented by formulae (12) to (17):

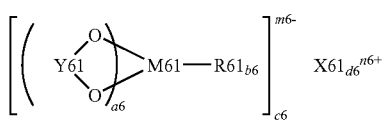
(12)

X61 represents a group 1A or 2A element in the short-form periodic table or aluminum (Al); M61 represents a transition metal or a group 3B, 4B, or 5B element in the short-form periodic table; R61 represents a halogen group; Y61 represents —C(=O)—R62-C(=O)—, —C(=O)—CR63$_2$-, or —C(=O)—C(=O)— where R62 represents an alkylene group, a halogenated alkylene group, an arylene group, or a halogenated arylene group, R63 represents an alkyl group, a halogenated alkyl group, an aryl group, or a halogenated aryl group, a6 represents an integer of 1 to 4, b6 represents an integer of 0, 2, or 4, and c6, d6, m6, and n6 each represent an integer of 1 to 3;

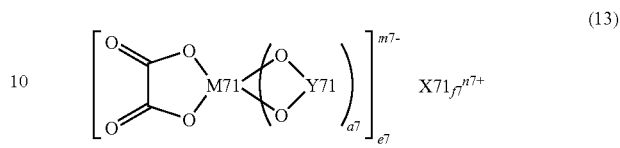
(13)

X71 represents a group 1A or 2A element in the short-form periodic table; M71 represents a transition metal or a group 3B, 4B, or 5B element in the short-form periodic table; Y71 represents —C(=O)—(CR71$_2$)$_{b7}$-C(=O)—, —R73$_2$C—(CR72$_2$)$_{c7}$-C(=O)—, —R73$_2$C—(CR72$_2$)$_{c7-CR}$73$_2$-, —R73$_2$C—(CR72$_2$)$_{c7}$-S(=O)$_2$—, —S(=O)$_2$—(CR72$_2$)$_{d7}$-S(=O)$_2$—, or —C(=O)—(CR72$_2$)$_{d7}$-S(=O)$_2$— where R71 and R73 each represent a hydrogen group, an alkyl group, a halogen group, or a halogenated alkyl group and at least one of R71 and R73 is a halogen group or a halogenated alkyl group, R72 represents a hydrogen group, an alkyl group, a halogen group, or a halogenated alkyl group, a7, e7, and n7 each represent an integer of 1 or 2, b7 and d7 each represent an integer of 1 to 4, c7 represents an integer of 0 to 4, and f7 and m7 each represent an integer of 1 to 3;

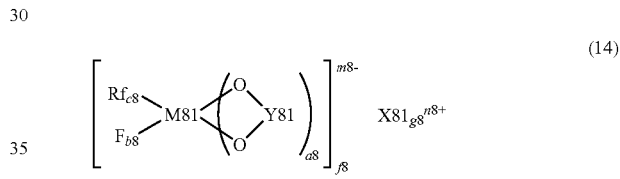
(14)

X81 represents a group 1A or 2A element in the short-form periodic table; M81 represents a transition metal or a group 3B, 4B, or 5B element in the short-form periodic table; Rf represents a C1-C10 fluorinated alkyl group or a C1-C10 fluorinated aryl group; Y81 represents —C(=O)—(CR81$_2$)$_{d8}$-C(=O)—, —R82$_2$C—(CR81$_2$)$_{d8}$-C(=O)—, —R82$_2$C—(CR81$_2$)$_{d8}$-CR82$_2$-, —R82$_2$C—(CR81$_2$)$_{d8}$-S(=O)$_2$—, —S(=O)$_2$—(CR81$_2$)$_{e8}$-S(=O)$_2$—, or —C(=O)—(CR81$_2$)$_{e8}$-S(=O)$_2$— where R81 represents a hydrogen group, an alkyl group, a halogen group, or a halogenated alkyl group, R82 represents a hydrogen group, an alkyl group, a halogen group, or a halogenated alkyl group and at least one of R82s is a halogen group or a halogenated alkyl group, a8, f8, and n8 each represent an integer of 1 or 2, b8, c8, and e8 each represent an integer of 1 to 4, d8 represents an integer of 0 to 4, and g8 and m8 each represent an integer of 1 to 3;

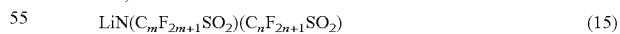
(15)

m and n each represent an integer of 1 or more;

(16)

R91 represents a C2-C4 linear or branched perfluoroalkylene group; and

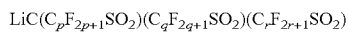

$$LiC(C_pF_{2p+1}SO_2)(C_qF_{2q+1}SO_2)(C_rF_{2r+1}SO_2) \quad (17)$$

p, q, and r each represent an integer of 1 or more.

12. The secondary battery according to claim 11, wherein the compounds represented by formula (12) are represented by formulae (12-1) to (12-6), the compounds represented by formula (13) are represented by formulae (13-1) to (13-8), and the compound represented by formula (14) is represented by formula (14-1):

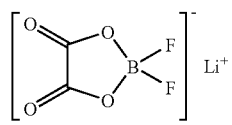
(12-1)

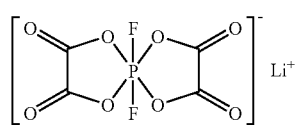
(12-2)

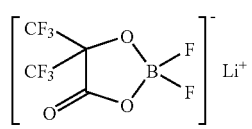
(12-3)

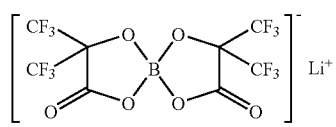
(12-4)

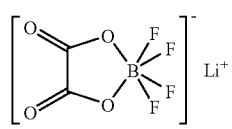
(12-5)

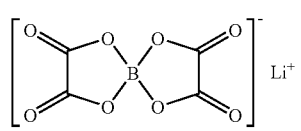
(12-6)

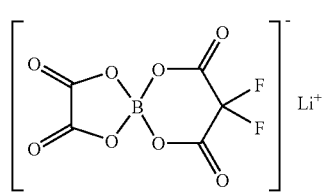
(13-1)

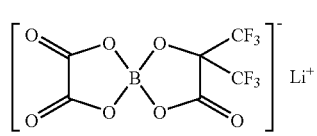
(13-2)

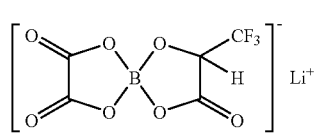
(13-3)

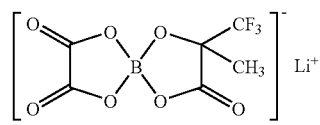
(13-4)

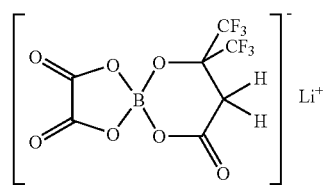
(13-5)

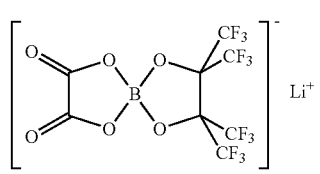
(13-6)

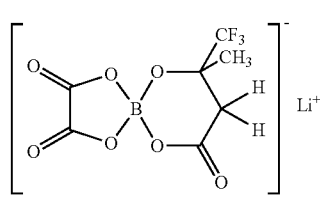
(13-7)

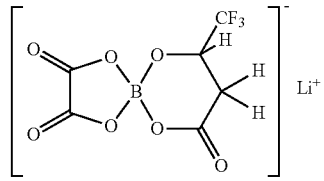
(13-8)

(14-1)

13. The secondary battery according to claim 1, wherein the negative electrode includes, as a negative electrode active material, a carbon material, lithium metal (Li), or a material that contains, as a constitutional element, at least one metal or semimetal element and that can occlude and release an electrode reactant.

14. The secondary battery according to claim 1, wherein the negative electrode includes, as a negative electrode active material, a material that contains at least one of silicon (Si) and tin (Sn) as a constitutional element.

15. The secondary battery according to claim 14, wherein the material that contains at least one of silicon and tin as the constitutional element is silicon as a single element or a material that contains tin, cobalt (Co), and carbon (C) as constitutional elements, in the material that contains tin, cobalt, and carbon, the carbon content is 9.9 mass % or more and 29.7 mass % or less and the ratio of the cobalt content to the total content of tin and cobalt (Co/(Sn+Co)) is 20 mass % or more and 70 mass % or less, and the half width of a diffraction peak obtained by X-ray diffraction is 1.0° or more.

16. The secondary battery according to claim 1, wherein the negative electrode includes a negative electrode active material layer including a plurality of negative electrode active material particles,
the negative electrode active material layer further includes an oxide-containing film coating surfaces of the negative electrode active material particles, and
the oxide-containing film contains at least one selected from a silicon oxide, a germanium (Ge) oxide, and a tin oxide.

17. The secondary battery according to claim 1, wherein the negative electrode includes a negative electrode active material layer including a plurality of negative electrode active material particles,
the negative electrode active material layer further includes a metal material that contains, as a constitutional element, a metal element that does not alloy with an electrode reactant, the metal material being present in voids inside the negative electrode active material layer, and
the metal element is at least one selected from iron (Fe), cobalt, nickel (Ni), zinc (Zn), and copper (Cu).

18. The secondary battery according to claim 1, wherein the positive electrode and the negative electrode can occlude and release an electrode reactant and the electrode reactant is lithium ions.

19. An electrolyte comprising:
a solvent; and
an electrolyte salt,
wherein the solvent contains A and B,
A is at least one selected from the group consisting of
ester compounds represented by formulae (1),
ester compounds represented by formulae (2),
ester compounds represented by formulae (3),
lithium monofluorophosphate, and
lithium difluorophosphate, and
B is at least one selected from the group consisting of
anhydrous compounds represented by formulae (4), and
anhydrous compounds represented by formulae (5):

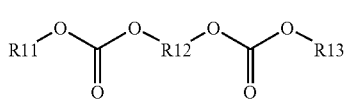
(1)

R11 and R13 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R12 represents a linear or branched alkylene group, an arylene group, a divalent group containing an arylene group and an alkylene group, a C2-C12 divalent group containing an ether bond and an alkylene group, or a halogenated group thereof;

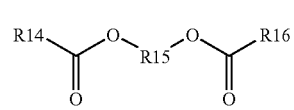
(2)

R14 and R16 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R15 represents a linear or branched alkylene group, an arylene group, a divalent group containing an arylene group and an alkylene group, a C2-C12 divalent group containing an ether bond and an alkylene group, or a halogenated group thereof;

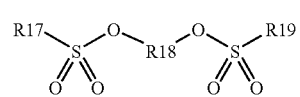
(3)

R17 and R19 each represent an alkyl group, an alkenyl group, an alkynyl group, an aryl group, a heterocyclic group, an alkyl, alkenyl, or alkynyl group substituted with an aromatic hydrocarbon group or an alicyclic hydrocarbon group, or a halogenated group thereof; R18 represents a linear or branched alkylene group, an arylene group, a divalent group containing an arylene group and an alkylene group, a C2-C12 divalent group containing an ether bond and an alkylene group, or a halogenated group thereof;

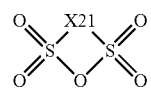
(4)

X21 represents a C2-C4 alkylene group that may be halogenated, a C2-C4 alkenylene group that may be halogenated, an arylene group that may be halogenated, or a derivative thereof; and

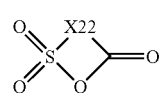
(5)

X22 represents a C2-C4 alkylene group that may be halogenated, a C2-C4 alkenylene group that may be halogenated, an arylene group that may be halogenated, or a derivative thereof.

20. The electrolyte according to claim 19, wherein the electrolyte is used in a secondary battery.

* * * * *